United States Patent
Ramesh et al.

(10) Patent No.: US 12,008,138 B1
(45) Date of Patent: Jun. 11, 2024

(54) METHOD FOR MAINTAINING PRIVACY AND SECURITY OF DATA

(71) Applicant: Lightbeam.ai, Inc., Palo Alto, CA (US)

(72) Inventors: Aditya Ramesh, San Jose, CA (US); Abhinay Nagpal, Fremont, CA (US); Himanshu Shukla, San Jose, CA (US)

(73) Assignee: Lightbeam.ai, Inc., Palo Alto, CA (US)

( * ) Notice: Subject to any disclaimer, the term of this patent is extended or adjusted under 35 U.S.C. 154(b) by 0 days.

(21) Appl. No.: 18/478,844

(22) Filed: Sep. 29, 2023

(51) Int. Cl.
*H04L 29/06* (2006.01)
*G06F 21/62* (2013.01)

(52) U.S. Cl.
CPC .............................. *G06F 21/6245* (2013.01)

(58) Field of Classification Search
None
See application file for complete search history.

(56) References Cited

U.S. PATENT DOCUMENTS

| | | | | |
|---|---|---|---|---|
| 8,020,213 B2* | 9/2011 | Chen | ..................... | H04L 63/105 726/2 |
| 8,498,998 B2* | 7/2013 | Eshwar | ............... | G06F 16/2465 707/765 |
| 8,965,848 B2* | 2/2015 | Caceres | ................ | G06F 16/215 707/634 |
| 9,501,552 B2* | 11/2016 | McGrew | ................ | G06F 16/219 |
| 9,535,902 B1 | 1/2017 | Michalak et al. | | |
| 10,091,230 B1* | 10/2018 | Machani | ............... | H04L 67/306 |
| 10,120,930 B2* | 11/2018 | Deshpande | ........... | G06F 16/319 |
| 10,282,389 B2 | 5/2019 | Liang et al. | | |
| 10,291,635 B2 | 5/2019 | Muddu et al. | | |
| 10,572,817 B2 | 2/2020 | Kardes et al. | | |
| 2013/0246315 A1 | 9/2013 | Joshi et al. | | |
| 2014/0046653 A1 | 2/2014 | Gopalakrishnan et al. | | |
| 2014/0101091 A1* | 4/2014 | Brown | ................ | G06F 16/2477 707/602 |
| 2017/0318015 A1* | 11/2017 | Revanur | ............. | G06F 21/6245 |
| 2023/0315886 A1* | 10/2023 | Zhao | ..................... | G06F 21/604 726/1 |

OTHER PUBLICATIONS

Chowdhury, Ziaul Islam, "Implementation of an abstract module for entity resolution to combine data sources with the same domain information", Degree Project, Aug. 2021, Lulea University of Technology, Germany, Master Programme in Data Science, 55 pgs.

(Continued)

*Primary Examiner* — Shin-Hon (Eric) Chen
(74) *Attorney, Agent, or Firm* — Ascenda Law Group, PC

(57) ABSTRACT

Datasource processors may communicate with an artificial intelligence (AI) engine in order to generate, in parallel, object summaries from datasource objects received from datasources. Each object summary may include an object identifier, one or more local entities, and a mapping from each of the one or more local entities to one or more attributes. A global entity resolver may augment the object summaries by mapping each of the local entities to a global entity. Policy engines may evaluate, in parallel, the object summaries with respect to a security and/or privacy policy. If a security and/or privacy violation is recognized, a remediation measure may be applied in connection with the datasource object for which the security and/or privacy violation exists.

18 Claims, 19 Drawing Sheets

(56) References Cited

OTHER PUBLICATIONS

Huu; et al., "Entity Resolution for Multiple Sources with Extended Approach", Artificial Intelligence and Cognitive Science, 2022, CCIS, vol. 1662, pp. 514-526.
Rahm, Erhard, "The Case for Holistic Data Integration", Advances in Databases and Information Systems, 2016, LNISA, vol. 9809, pp. 11-27.

* cited by examiner

| 22222 | a Employee's social security number | OMB No. 1545-0008 | | |
|---|---|---|---|---|
| b Employer identification number (EIN) | | | 1 Wages, tips, other compensation | |
| c Employer's name, address, and ZIP code | | | 3 Social security wages | |
| | | | 5 Medicare wages and tips | |
| | | | 7 Social security tips | |

METHOD FOR MAINTAINING PRIVACY AND SECURITY OF DATA

FIELD OF THE INVENTION

The present invention relates to a system and method for maintaining the privacy and security of data, and more specifically relates to a privacy-aware data discovery process.

BACKGROUND

With the onset of the Information Age, data is now at the forefront of many new technologies. Data drives the discovery of new biological treatments, the development of artificial intelligent systems, e-commerce platforms, self-driving automobiles, etc. At the same time, the breaches to the secure storage and transfer of data have resulted in serious consequences, for example with the leak of classified government information, leak of sensitive personal information, etc. To safeguard the continued development and progress of the Information Age, much work in the field of data privacy and data security is still needed.

SUMMARY OF THE INVENTION

Data privacy generally refers to a person's or organization's ability to determine whether data associated with the person or organization is being stored, communicated and used in a manner that is deemed acceptable to the person or organization. At the heart of data privacy is a data privacy policy which governs who has access to whose data. In contrast, data security relates to the safeguards and tools necessary to uphold the data privacy policy. Challenges in the field of data privacy and data security involve determining whether data is sensitive (i.e., whether that data needs protection), determining where sensitive data is stored, to whom that sensitive data applies towards and the ability to carry out a data privacy and security policy across a distributed system. What is needed is a privacy-aware data discovery process, a system that has the ability to identify the types of entities present within the data (e.g., customer, vendor or partner), and a way to configure policies to be specific to the needs of the respective entities.

In accordance with one embodiment of the invention, a plurality of datasource processors may receive, in parallel, datasource objects from respective ones of a plurality of datasources, each datasource processor being communicatively coupled to one or more of the plurality of datasources. The datasource processors may communicate with an artificial intelligence (AI) engine in order to generate an object summary from each of the datasource objects. Each object summary may include an object identifier, one or more local entities, and a mapping from each of the one or more local entities to one or more attributes. Each thread of the artificial intelligence (AI) engine may include a text extractor (configured to determine text included in the datasource object), a layout extractor (configured to determine the layout of the text, and arrange the text based on the layout of the text), an object classifier (configured to determine a category of the datasource object based on the text and layout of the text), an attribute extractor (configured to determine one or more attributes included in the datasource object based on the extracted text, layout and determined category of the datasource object), and a local entity resolver (configured to group the attributes into one or more attribute groups, each belonging to a single entity). The AI engine may have multiple threads allowing multiple object summaries to be generated in parallel.

A global entity resolver may augment the object summaries by mapping the local entities to global entities. A plurality of threads may be used to map the local entities to existing global entities. For local entities that cannot be mapped to an existing global entity, a single thread may be used to map the local entities to new global entities.

Policy engines may evaluate, in parallel, the object summaries with respect to a security and/or privacy policy. If a security and/or privacy violation is recognized, a remediation measure may be applied in connection with the datasource object for which the security and/or privacy violation exists.

These and other embodiments of the invention are more fully described in association with the drawings below.

BRIEF DESCRIPTION OF THE DRAWINGS

FIG. 9A depicts an example form.

FIG. 9B depicts an example template constructed from the example form of FIG. 9A, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
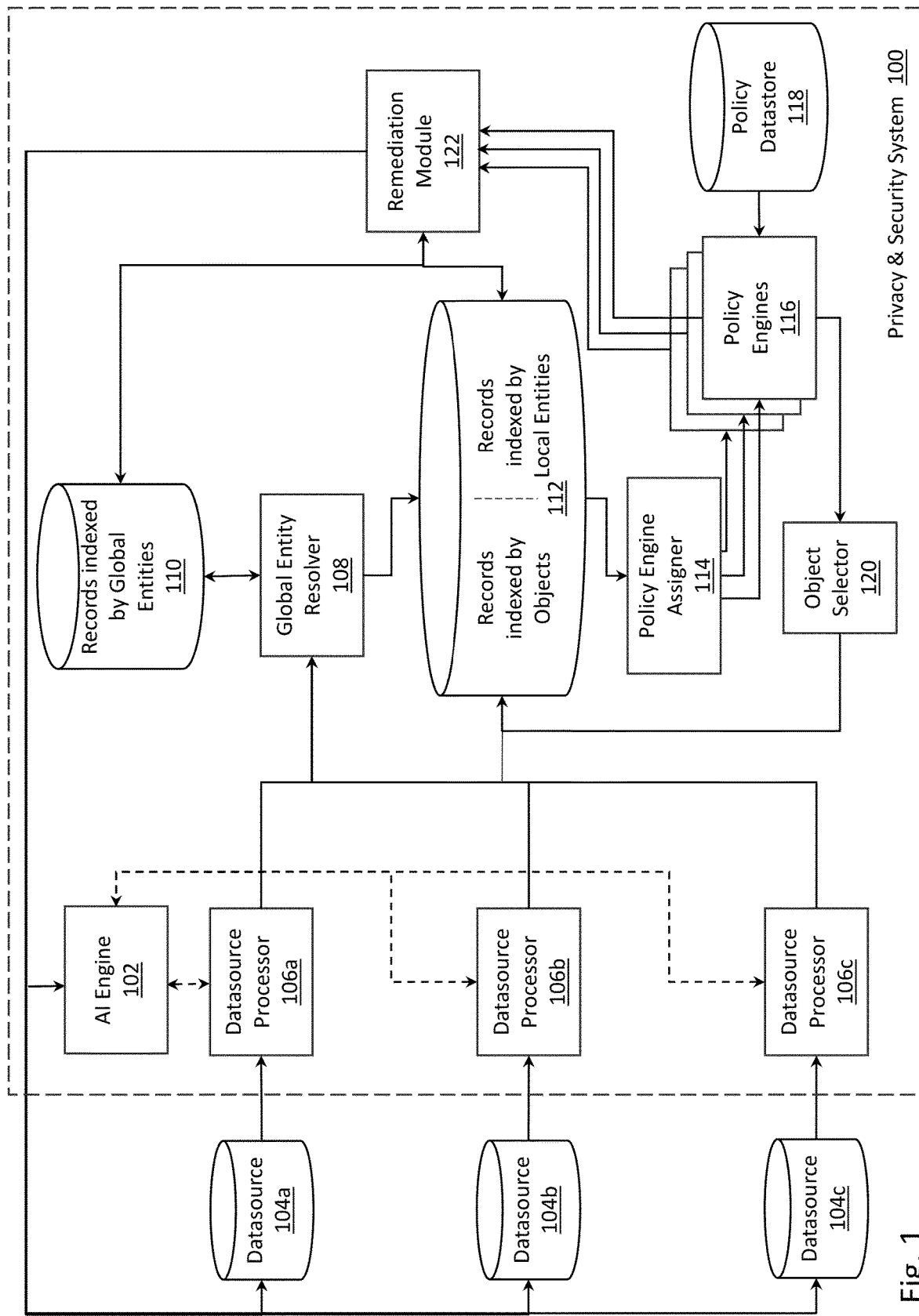
FIG. 1 depicts a privacy and security system communicatively coupled to a plurality of datasources, in accordance with one embodiment of the invention.

FIG. 1 depicts a privacy and security system 100. At a high level, privacy and security system 100 may apply one or more data policies stored in policy datastore 118 to the datasource objects stored in datasources 104a, 104b, 104c. For instance, the data policy could be related to a data retention policy (e.g., if a legal hold has been placed on a datasource object, retain the datasource object), a data deletion policy (e.g., delete all datasource objects associated with a certain user upon the request of the user), a data privacy policy (e.g., only allow employees in the human resource department to access a datastore storing the addresses of employees), and/or a data security policy (e.g., use a certain level of data encryption when storing sensitive information). More specifically, privacy and security system 100 is tasked with extracting the text from datasource objects, understanding the meaning of the text (e.g., whether a nine digit number represents a social security number or a passcode), determining an entity associated with the text (e.g., the nine digit number represents a social security number belonging to John Doe), determining based on the extracted text and metadata from the datasource object, whether the datasource object is subject to a data policy, and finally, applying the data policy to the datasource object, if necessary.

Privacy and security system 100 may be communicatively coupled to a plurality of datasources 104a, 104b, 104c, each of which stores one or more datasource objects. For instance, datasource 104a may store emails of a mail server (not depicted), such as a Microsoft Exchange® server of Microsoft Corp. of Redmond, WA; datasource 104b may store tables (e.g., SQL® files, Excel® files) associated with customer accounts (e.g., the tables containing customer names, customer addresses, items purchased, etc.); and datasource 104c may store service requests and/or tickets (e.g., created by Salesforce Inc.® of San Francisco, CA or ServiceNow Inc.® of Santa Clara, CA). Emails may be regarded as unstructured data; tables may be regarded as structured data; and service requests and/or tickets may be regarded as semi-structured data. While three datasources have been depicted for the sake of simplicity, it is understood that any number of datasources may be employed in practice.

A plurality of datasource processors 106a, 106b, 106c may receive datasource objects from one or more of the plurality of datasources 104a, 104b, 104c. For example, datasource processor 106a may receive datasource objects from datasource 104a; datasource processor 106b may receive datasource objects from datasource 104b; and datasource processor 106c may receive datasource objects from datasource 104c. The datasource objects may be received in parallel by the datasource processors 106a, 106b, 106c, meaning that while datasource processor 106a is receiving datasource object A, datasource processor 106b is receiving datasource object B, and datasource processor 106c is receiving datasource object C. For simplicity of illustration, the datasource objects have not been illustrated in FIG. 1.

Each datasource object may include metadata and a content body. In the example of a datasource object in the form of an e-mail, the metadata may include the e-mail address of the sender and the e-mail address of the recipient, while the content body may include the message that the sender intends to send to the recipient. In the example of a datasource object in the form of a ticket (e.g., a Slack® ticket available from Salesforce Inc.), the metadata may include whether that ticket is being sent over a public or private channel, and the content body may include a service request that is described in the ticket. In the example of a datasource object in the form of a document stored in the cloud (e.g., Google Drive®, Dropbox®, Box®), the metadata may include a list of individuals with access to the document, and the content body may include images, tables, paragraphs, etc. of the datasource object.

Each datasource object may be tagged with a priority (e.g., high, medium, low), and such priority may indicate how promptly a datasource object needs to be processed by a datasource processor. For instance, an email that has just been received by the mail server may be tagged with high priority, as it may need to be processed and evaluated in accordance with one or more policies before the email can be forwarded to the intended recipient.

For each datasource object that is received, the respective data processor 106a, 106b or 106c, may generate an object summary corresponding to the datasource object. The object summary may include an object identifier (e.g., object ID: O123), one or more local entities derived from the respective datasource object (e.g., local entity ID: 1), and a mapping from each of the one or more local entities to one or more attributes derived from the respective datasource object (e.g., Name: John Doe, DOB: Jan. 1, 1980, Phone Number: 650-111-1111). While represented as an alphanumeric or binary string, the object identifier may conceptually identify an email, an identity document (e.g., a driver's license), a tax return, etc. While represented as an alphanumeric or binary string, the local entity may conceptually represent a person, an organization or a device. The adjective "local" is used in the sense that the determination of the local entity takes into consideration information present within the datasource object itself and possibly a source of truth datastore (explained in FIG. 2), but does not take into consideration the relationship of entities across multiple datasource objects. An attribute may generally include a key-value pair. In the above example, "Name" may represent a key and "John Doe" may represent a value.

Further information may be included in an object summary, such as confidence levels, in which each confidence level indicates a confidence associated with a key being paired with a value, entity labels such as employee, customer, client, vendor, etc., and object tags such as confidential, restricted, sensitive, etc. Additionally, an object summary may include metadata, such as the recipient and/or sender email addresses for an email object and the sharing permissions (e.g., who has access to the file) for a Google Drive® file object. Furthermore, an object summary may include a pre-defined number of categories such as finance, identity, legal, human resources and medical.

The datasource processors 106a, 106b, 106c may communicate with artificial intelligence (AI) engine 102 in order to generate an object summary for each of the datasource objects. Artificial intelligence (AI) engine 102 may process datasource objects in parallel in order to expedite the generation of object summaries. The resources of AI engine 102, however, may be limited such that there may be a maximum number of datasource objects that may be processed in parallel. Details of AI engine 102 is explained in more detail in FIGS. 2-7 below. Once an object summary has been generated by AI engine 102 and provided to one of the datasource processors, the datasource processor may store the object summary in object summary datastore 112.

Upon the request of the one or more datasource processors 106a, 106b, 106c, global entity resolver 108 may augment the object summaries stored at object summary datastore 112 to include information regarding global entities. More specifically, one or more local entities recorded in each of the object summaries may be aggregated in batches at a queue of the global entity resolver 108, in which each batch of local entities are collected by a scheduler of the global entity resolver 108 over a time period (e.g., 1 minute, 1 hour, 1 day, 1 week, etc.). For each of the local entities aggregated at the queue, the global entity resolver 108 may map the local entity to one of the existing global entities stored in datastore 110, or map the local entity to a new global entity if none of the existing global entities are deemed to be a sufficiently good match. Additional details of the global entity resolver 108 are explained in connection with FIG. 8. As will become clearer in the examples of FIGS. 10A-10F, datastore 110 may store records indexed by global entity identifiers, in which each of the global entity identifiers may be mapped to one or more local entities associated with the global entity identifier, and a set of attributes associated with the global entity identifier.

In one embodiment, the records representing the object summaries may be indexed by object identifiers and also indexed by local entities. Example object summaries are provided in FIGS. 10A-10F below. It is noted that the datastores 110 and 112 depicted in FIG. 1 are intended to represent a logical representation of how the respective records are stored. In an actual implementation, it is understood that the records may be stored in one or more storage elements, which may be present within one chassis, distributed in a networked storage system, etc.

A policy engine assigner 114 may assign each of the object summaries to one of the policy engines 116. Once an object summary is received by one of the policy engines 116, the policy engine 116 may evaluate the object summary with respect to one or more security and/or privacy policies stored in policy datastore 118. The evaluation may include determining, for each object summary, whether a security and/or privacy violation exists with respect to the respective datasource object with which the object summary is associated. For increased efficiency, the policy engines 116 may perform the evaluation step in parallel with one another. The security and/or privacy violation is recognized if an operation concerning the datasource object associated with the object summary violates the security and/or privacy policy. If the security and/or privacy violation is recognized, remediation module 122 may apply a remediation measure in connection with the datasource object for which the security and/or privacy violation exists.

For instance, the operation may be the forwarding of an email with sensitive information to an individual outside of an organization. Upon determining that such operation violates a security and/or privacy policy stored at policy datastore 118, remediation module 122 may communicate with an email server (not depicted) to block that email from being forwarded. As another example, the evaluation by one of the policy engines 116 may determine that certain datasource objects should be deleted, for example, in response to a request from a user to delete his/her account and all of its associated data. In such case, one of the policy engines 116 may send a request to the remediation module 122 to delete all datasource objects belonging to the user. Remediation module 122 may query one or more of datastores 110 and 112 to determine the datasource objects belonging to the user, and then communicate with one or more of the datasources 104a, 104b, 104c to effect the deletion of the datasource objects belonging to the user. As another example, the evaluation by one of the policy engines 116 may determine that a new attribute should be monitored. In response to this determination, one of the policy engines 116 may communicate this request to the remediation module 122, which may in turn communicate with the AI engine 102 to modify the behavior of the attribute extractor to extract the new attribute.

Occasionally, one or more policies at policy datastore 118 may be updated. Instead of the policy engines 116 re-evaluating all of the object summaries stored at the object summary datastore 112, which would be inefficient, an object selector 120 may select only those object summaries that are impacted by the update to the security and/or privacy policy, and the policy engines 116 may re-evaluate only the selected object summaries based on the updated security and/or privacy policy.

Figure 2:
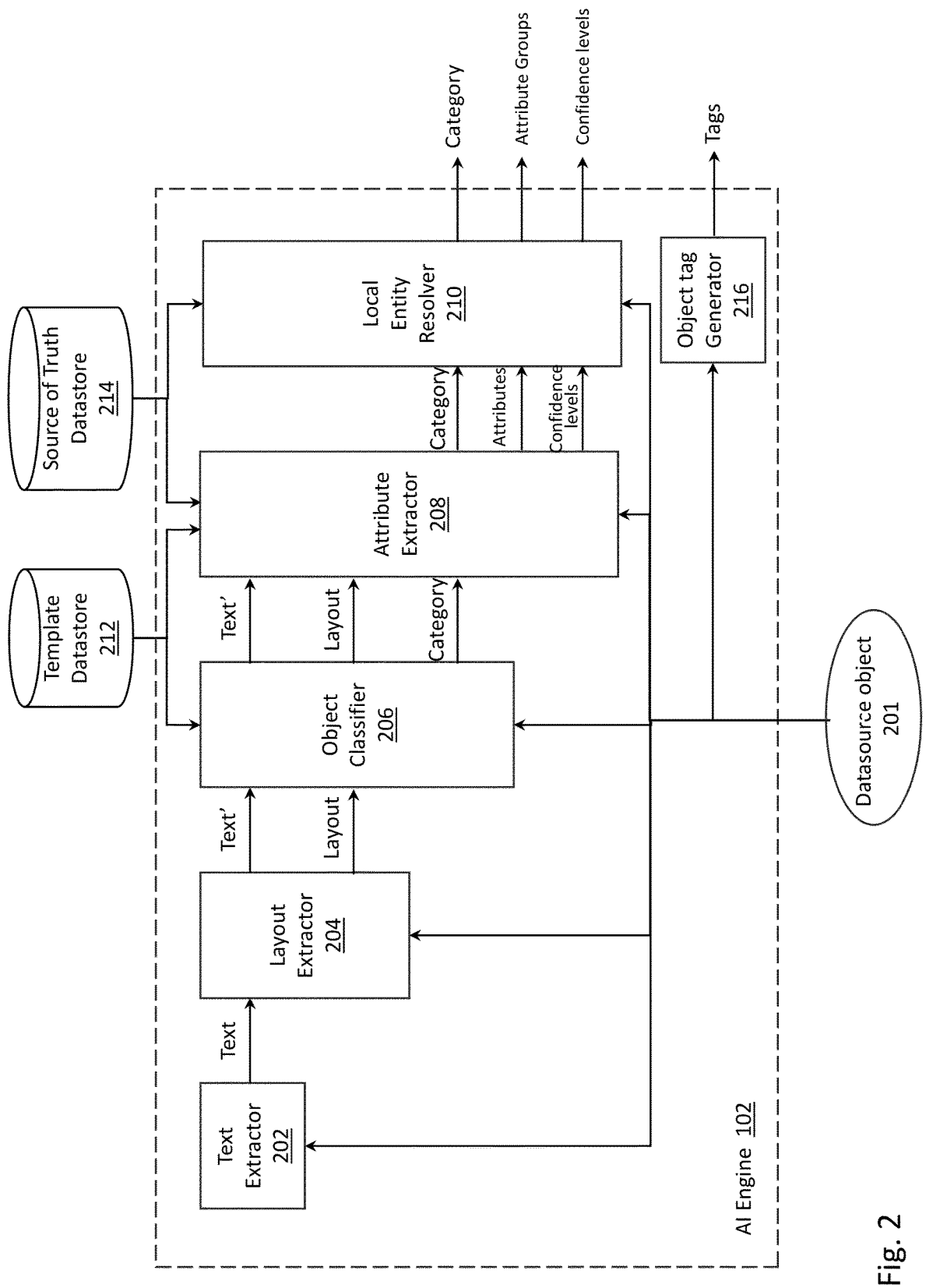
FIG. 2 depicts additional details regarding the artificial intelligence (AI) engine, in accordance with one embodiment of the invention.

FIG. 2 depicts additional details regarding the AI engine 102, which may be communicatively coupled to a template datastore 212 and a source of truth datastore 214, the purpose of which will be explained below. Such datastores were not depicted in FIG. 1 for ease of illustration, but in a more complete version of FIG. 1, such datastores would also be shown. To clarify, what is shown in FIG. 2 represents one thread of AI engine 102 for generating an object summary (e.g., including a category of the datasource object, one or more attribute groups of the datasource object, confidence levels associated with the attributes, tags of the datasource object, etc.) for one datasource object (e.g., datasource object 201) received from one of the datasource processors 106a, 106b, 106c. In practice, AI engine 102 may have multiple threads (e.g., with one text extractor 202, one layout extractor 204, one object classifier 206, one attribute extractor 208, and one local entity resolver 210 for each of the threads), allowing AI engine 102 to prepare multiple object summaries in parallel. The resources of AI engine 102, however, are limited so that there may be a maximum number of threads that AI engine 102 may employ at any given time.

Figure 3A:
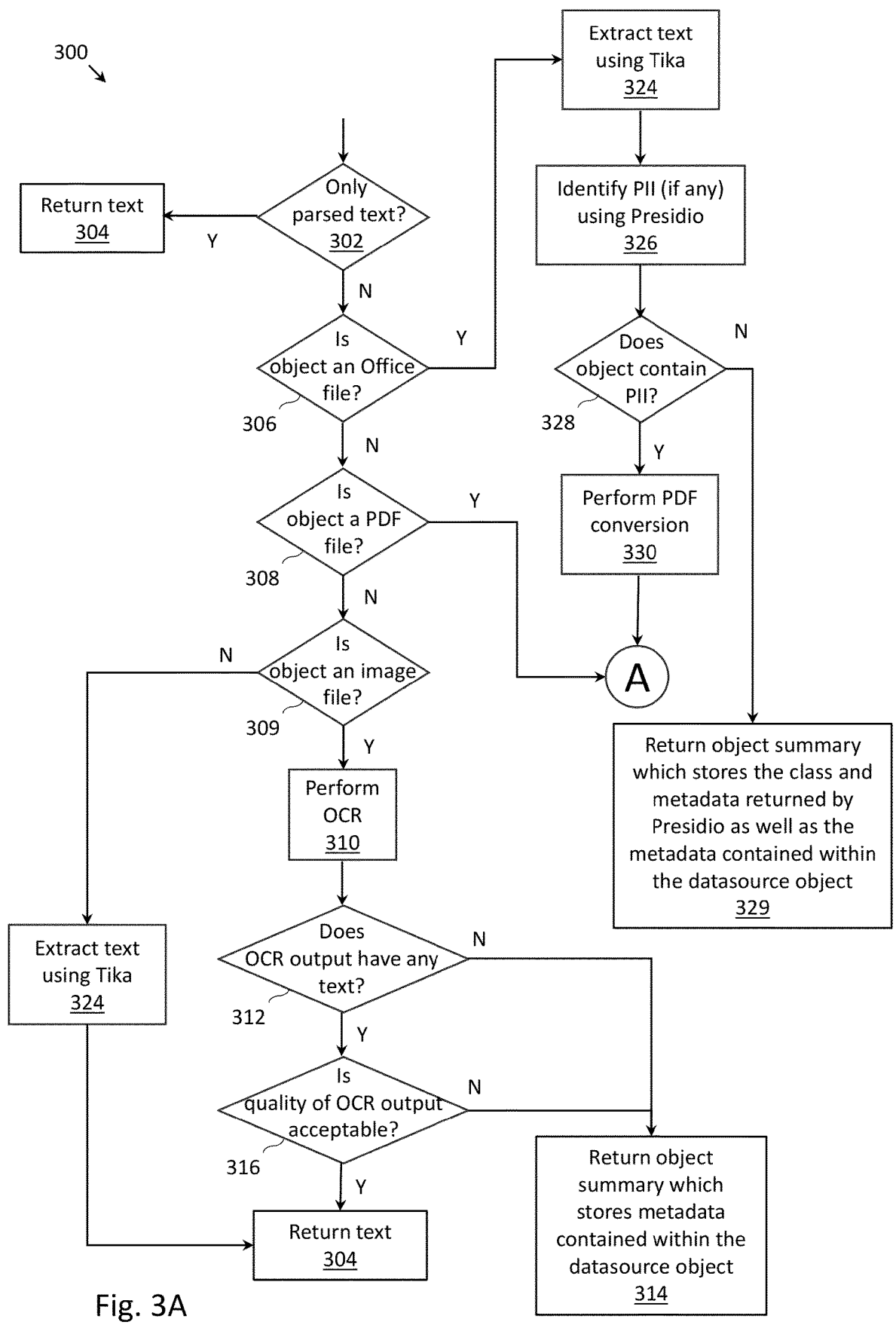
FIGS. 3A and 3B depict a flow diagram of a process performed by the text extractor, in accordance with one embodiment of the invention.
Figure 3B:
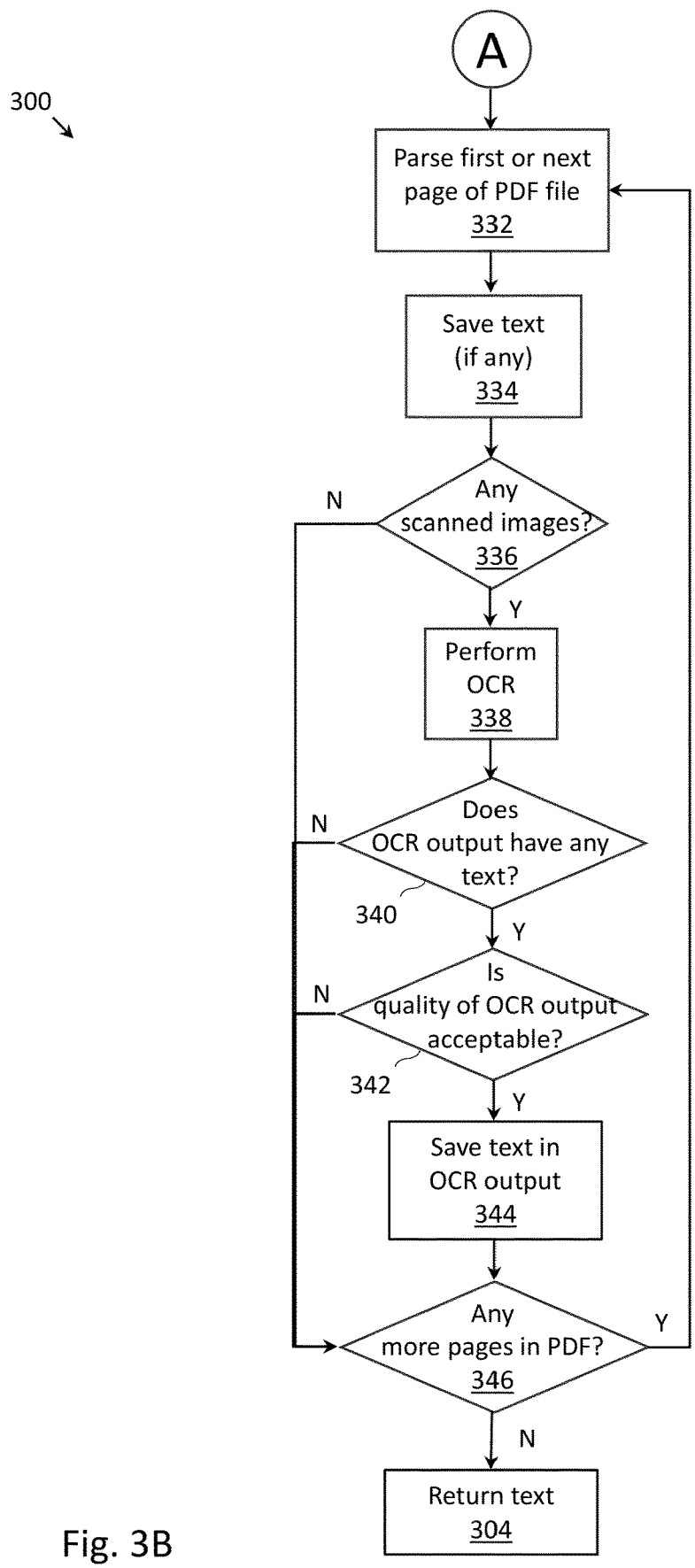

Text extractor 202 may be configured to determine text included in the datasource object 201, and its operation is explained in more detail in FIGS. 3A and 3B. Layout extractor 204 is configured to determine the layout of the text, and arrange the text based on the layout of the text. For clarity of illustration, the text received by the layout extractor 204 is indicated as "Text" in FIG. 2, whereas the text output by the layout extractor 204 is indicated as "Text' " in FIG. 2. As more clearly explained in FIGS. 4A and 4B, "Text' " may represent an arranged version of text or the original text received by the layout extractor 204 in the case that the text of the datasource object does not contain any formatting. The operation of the layout extractor 204 is explained in more detail in FIGS. 4A and 4B.

Object classifier 206 may be configured to determine a category of the datasource object based on the text and layout of the text. If the datasource object matches a template stored in template datastore 212, the template may additionally be used to determine the category of the datasource object. Example categories include finance, identity, legal, human resources and medical. For instance, a W-2, a 10-K and a purchase order may fall within the category of finance. A drivers license, social security card, company badge and passport may fall within the category of identity. A non-disclosure agreement (NDA), an employee contract, a rental lease and a license agreement may fall within the category of legal. An employee review, a job posting, or a job offer may fall within the category of human resources. A medical diagnosis, prescription, or lab result may fall within the category of medical. The operation of the object classifier 206 is explained in more detail in FIG. 5.

Attribute extractor 208 may be configured to determine one or more attributes included in the datasource object based on the extracted text, layout and determined category of the datasource object. If the datasource object matches a template stored in template datastore 212, the template may additionally be used to determine the attributes of the datasource object. Typically, attributes are expressed as key-value pairs, and if this so, the attribute extractor 208 may additionally assign a confidence level to each of the key-value pairs that indicates a confidence associated with the key being paired with the value. Various factors may influence the confidence level. For instance, if the datasource object matches a template, the confidence level of all key-value pairs determined using the template may be high. Additionally, source of truth datastore 214 may contain key-value pairs that are known with certainty (e.g., provided by the user at an initial setup process). Therefore, any extracted attributes that match attributes stored in the source of truth datastore 214 can be assigned a high confidence level. The operation of the attribute extractor 208 is explained in more detail in FIG. 6.

Local entity resolver 210 may group the attributes into one or more attribute groups, in which each attribute group includes attributes that are associated with a single entity (e.g., person, organization, device). Source of truth datastore 214 may also contain attributes that are grouped into attribute groups belonging to a single entity. Therefore, the source of truth datastore 214 may be used to guide the grouping of attributes that have been extracted from a datasource object. The operation of the local entity resolver is explained in more detail in FIG. 7.

Lastly, data processor 106 may include an object tag generator 216 configured to generate one or more object tags (e.g., confidential, sensitive, restricted, public, internal, etc.) from the metadata of the datasource object. Conceptually, object tags are similar to the one or more categories generated by the object classifier 206; however, the main difference is that the object classifier 206 may rely upon the output of the layout extractor 204 (e.g., including the text' and layout) to categorize the datasource object, whereas the object tag generator 216 may generate the object tag based on the output of the layout extractor 204 (e.g., including the text' and layout) and additionally based on the metadata of the datasource object (i.e., provided in the datasource object 201 itself). For simplicity of illustration, links/arrows from the output of the layout extractor 204 to the object tag generator 216 have been omitted in FIG. 2, but it should be understood that in practice, such links/arrows may be present.

As some examples of the operation of the object tag generator 216, the sender and the recipient an email (both of which may be considered as metadata of an email) may be used by the object tag generator 216 to determine whether that email should be tagged as confidential or not. As another example, the channel of a message (e.g., public or private—the channel considered as metadata of a message) may be used by the object tag generator 216 to determine whether the message should be tagged as confidential or not. As another example, the list of individuals that a file is shared with (i.e., the list of individual considered as metadata of a file) may be used by the object tag generator 216 to determine whether the file should be tagged as confidential or not. As another example, the output of the layout extractor 204 may be used by the object tag generator 216 to determine whether an datasource object should be tagged as confidential or restricted. As another example, a datasource object that includes the phrase "non-disclosure agreement" or the word "confidential" may be tagged as confidential.

FIGS. 3A-3B depict a flow diagram 300 of a process that may be performed by the text extractor 202. In step 302, the text extractor 202 may determine whether the datasource object only contains parsed text. To clarify, parsed text refers to the textual content of a datasource object which can be read without an application specific reader (e.g., PDF® reader, Word® application, Excel® application, etc.). If so (yes branch of step 302), no text extraction is necessary, and the text extractor 202 may simply return, in step 304, the text within the datasource object. If the datasource object does not contain only parsed text (no branch of step 302), the text extractor 202 may, in step 306, determine whether the datasource object is an office file (i.e., is a Microsoft Office® file), such as a Word®, Excel®, PowerPoint® or Visio® file. For instance, the text extractor 202 may determine whether the datasource object is an office file by analyzing the file extension of the datasource object. A .DOC or .DOCX extension may indicate that the file is a Microsoft Word® file; a .XLS or .XLSX extension may indicate that the file is a Microsoft Excel® file; a .PPT or .PPTX extension may indicate that the file is a Microsoft PowerPoint® file; and a .VDX or .VSDX extension may indicate that the file is a Microsoft Visio® file. Further, the text extractor 202 may determine whether the datasource object is an office file by additionally analyzing the file signature contained in the header of the datasource object.

If the datasource object is an office file (yes branch of step 306), the text extractor 202 may, in step 324, use Tika (i.e., Apache® Tika, a content analysis toolkit developed by the Apache Software Foundation of Wakefield, MA) to extract metadata and/or text from the datasource object. At step 326, Presidio® (i.e., Microsoft Presidio® from Microsoft Corp of Redmond, WA) or a modified version of Presidio® may be used to identify PII (personal identifiable information) in the text extracted by Tika. More specifically, a custom PII recognizer leveraging Named Entity Recognition (NER) may be used to identify PII in the text extracted by Tika. The modified version of Presidio® may be adapted to handle source of truth (SoT) attributes as well as to perform natural language understanding.

If Presidio® determines the datasource object to contain PII (yes branch of step 328), the office file may be converted into a portable document format (PDF) file in step 330, by for example Adobe Acrobat® developed by Adobe Inc.® of San Jose, CA. If Presidio® determines that the datasource object does not contain any PII (no branch of step 328), AI engine 102 may return an object summary which stores the class and metadata returned by Presidio® as well as the metadata contained within datasource object (step 329). For example, Presidio® might return the class of finance or legal and the metadata of sensitive, confidential or restricted. Example of metadata contained within datasource object have already been provided above. Such an object summary, however, may not include any attribute or entity details. The reason for performing the initial check to determine whether the datasource object contains any PII prior to the PDF conversion is that PDF conversion is a computationally expensive process. Thus, it is more efficient to avoid the PDF conversion if it can be determined beforehand that the datasource object does not contain any PII.

Returning to step 306, if the datasource object is determined to not be an office file (no branch of step 306), text extractor 202 may determine, in step 308, whether the datasource object is a PDF file by analyzing the file extension of the datasource object and/or the file signature included in the header of the datasource object. For instance, the .PDF file extension may indicate the file to be a PDF file. If the file is determined to be a PDF file (yes branch of step 308), the text extractor 202 may use, in step 332, a PDF parser (also called a PDF scraper) to parse each page (or more generally, a portion) of the PDF file. In other words, a PDF parser may be used to extract data from the PDF file, the data including text, tabular data (e.g., tables and lists) and images. One example PDF parser is pdfminer.six which is an open source tool for extracting the text directly from the source code of a PDF file. If the datasource object is determined to not be a PDF file (no branch of step 308), text extractor 202 may determine, in step 309, whether the datasource object is an image file by analyzing the file extension of the datasource object and/or the file signature included in the header of the datasource object. For instance, the .JPG, .JPEG, .PNG, or .TIFF file extensions may indicate the file to be an image file. If the datasource object is determined to not be an image file (no branch of step 309), Tika® may be used, in step 324, to extract the text from the datasource object, which is then returned, in step 304, by the text extractor 202.

The PDF parsing in step 332 may also be performed after step 330 in which an office file is converted into a PDF file. At step 334, text extractor 202 may save any text (or more generally, any extracted data) that has been parsed from the page of the PDF file. At step 336, text extractor 202 may determine whether any images (e.g., scanned images) have been parsed from the PDF file. If not (no branch of step 336), text extractor 202 may determine, in step 346, whether there are any additional pages of the PDF file that have not yet been parsed. Otherwise, if images have been parsed from the PDF file (yes branch of step 336), optical character recognition (OCR) may be performed on the datasource object in step 338 to recognize the text in the datasource object. For example, the OCR tool provided by Adobe Acrobat® may be used to carry out step 338.

At step 340, text extractor 202 may determine whether the OCR output contains any text. If not (no branch of step 340), text extractor 202 may determine, in step 346, whether there are any additional pages of the PDF file that have not yet been parsed. Otherwise, if the OCR output does contain text (yes branch of step 340), text extractor 202 may determine, in step 342, whether a quality of the OCR output is acceptable. If not (no branch of step 342), text extractor 202 may determine, in step 346, whether there are any additional pages of the PDF file that have not yet been parsed. Otherwise, if the quality of the OCR output is acceptable (yes branch of step 342), the text (or more generally the data) in the OCR output may be saved in step 344. Following step 344, text extractor 202 may determine, in step 346, whether there are any additional pages of the PDF file that have not yet been parsed. If not (no branch of step 346), text extractor 202 may return the parsed text and/or OCR output (or more generally the extracted data) in step 304. Otherwise, if there are additional pages of the PDF file that have not yet been parsed (yes branch of step 346), the text extractor 202 may parse the next page of the PDF file in step 332.

Returning to step 309, if the datasource object is determined to be an image file (yes branch of step 309), OCR may be performed on the datasource object in step 310 to recognize the text in the datasource object. At step 312, text extractor 202 may determine whether the OCR output contains any text. If not (no branch of step 312), AI engine 102 may return an object summary which stores metadata contained within the datasource object (step 314), but such an object summary may not include any attribute or entity details. Otherwise, if the OCR output does contain text (yes branch of step 312), text extractor 202 may determine, in step 316, whether a quality of the OCR output is acceptable. If not (no branch of step 316), AI engine 102 may return an object summary which stores metadata contained within the datasource object (step 314), but such an object summary may not include any attribute or entity details. Otherwise, if the quality of the OCR output is acceptable (yes branch of step 316), text extractor 202 may return the extracted text (or more generally the OCR output) in step 304.

Figure 4A:
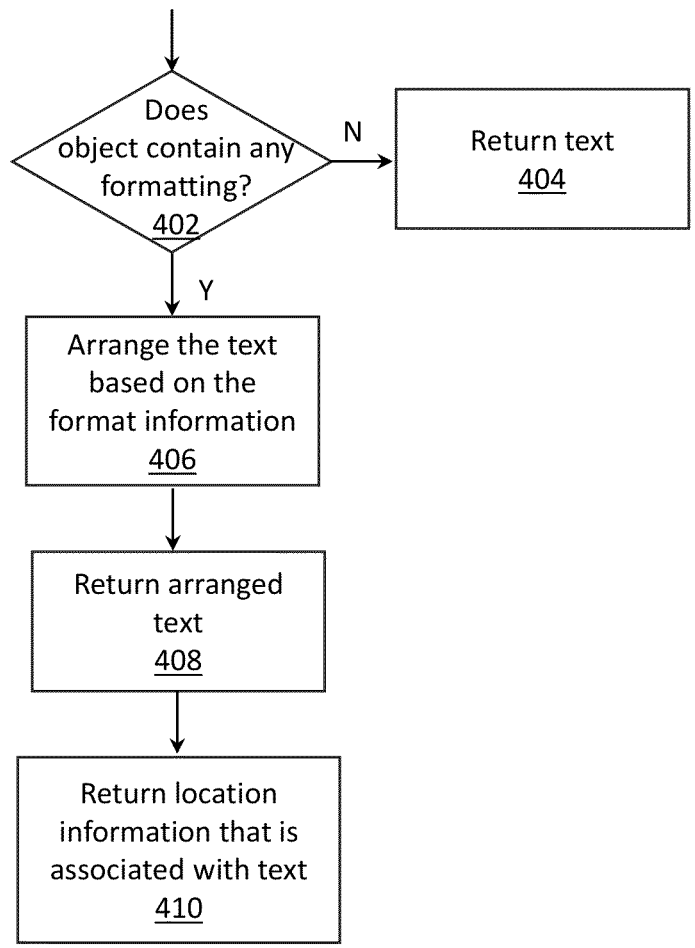
FIG. 4A depicts a flow diagram of a process performed by the layout extractor, in accordance with one embodiment of the invention.

FIG. 4A depicts flow diagram 400 of a process that may be performed by the layout extractor 204. At step 402, layout extractor 204 may determine whether the datasource object contains any formatting (e.g., font, paragraphs, tables, grids, etc.). If not (no branch of step 402), layout extractor 204 may return the text that was received from the data extractor 202 without any further processing. Otherwise, if layout extractor 204 determines that the datasource object does contain formatting (yes branch of step 402), layout extractor 204 may arrange, in step 406, the text based on the format information (see flow diagram 401 in FIG. 4B for additional details). At step 408, layout extractor 204 may return the arranged text. For instance, text representing key-value pairs may be arranged in pairs. At step 410, layout extractor 204 may return location information that is associated with the text. For instance, text may be labeled with the column and line number indicating the location of the text on a page of a datasource object. As another example, text may be labeled with the Euclidean coordinates of the text represented as a rectangular bounding box around the text, which may be used to determine the relative position of the various fragments of the text.

Figure 4B:
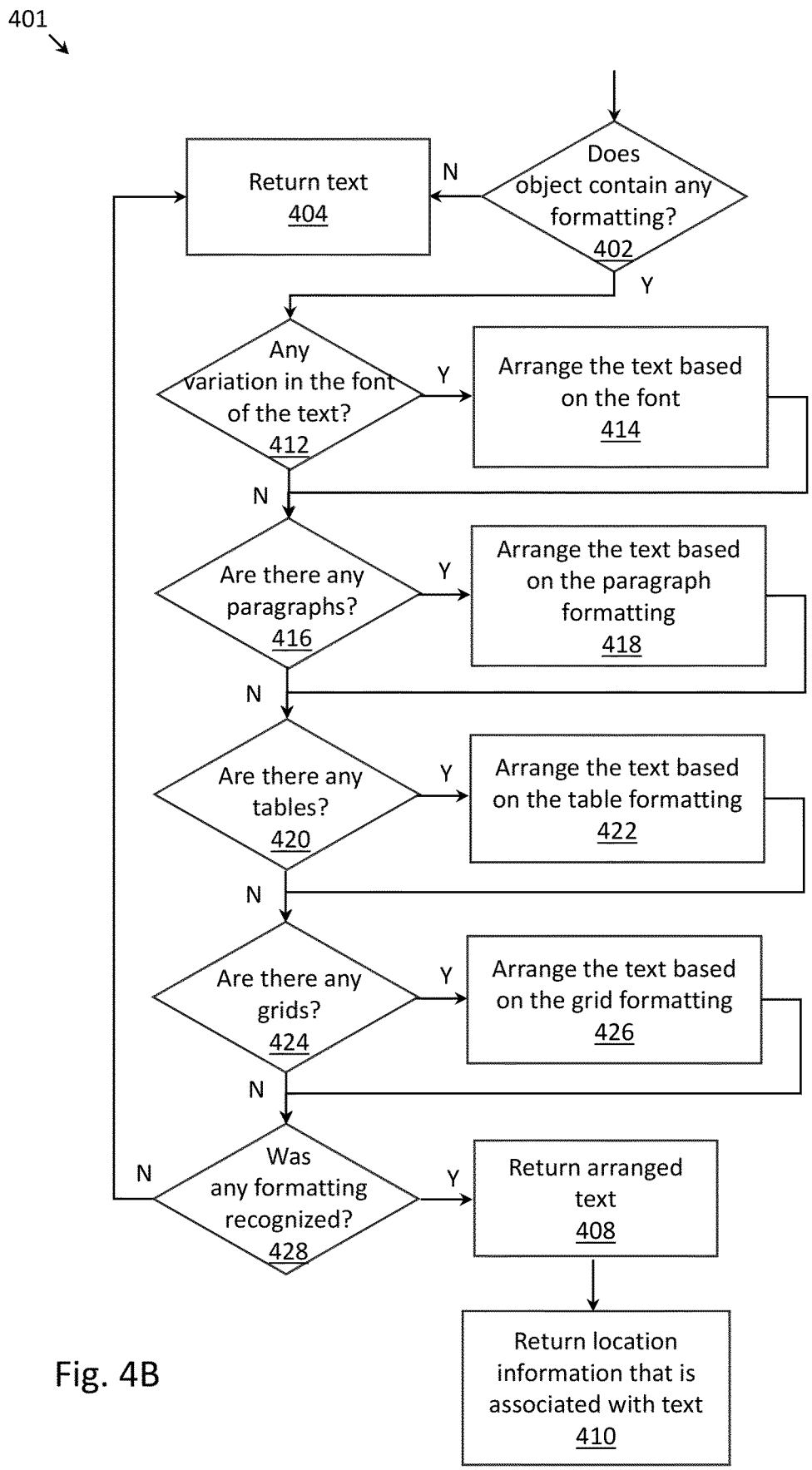
FIG. 4B depicts a flow diagram of a more detailed process performed by the layout extractor, in accordance with one embodiment of the invention.

FIG. 4B depicts flow diagram 401 of a more detailed process that may be performed by the layout extractor 204. At step 402, layout extractor 204 may determine whether the datasource object contains any formatting (e.g., font, paragraphs, tables, grids, etc.). If not (no branch of step 402), layout extractor 204 may return the text that was received from the data extractor 202 without any further processing.

Otherwise, if layout extractor 204 determines that the datasource object does contain formatting (yes branch of step 402), layout extractor 204 may determine, in step 412, whether there is any variation in the font of the text (e.g., with the assistance of PDFminer.six). The variation in the font could include variation in the font size, the font color and/or the font attributes (e.g., bold, underline, italics, highlight, etc.). If there is variation in the font of the text (yes branch of step 412), the layout extractor 204 may arrange the text based on the font in step 414. For instance, text with the same font size could be grouped together.

Following step 414 or if there is no variation in the font of the text (no branch of step 412), layout extractor 204 may determine, in step 416, whether the extracted text contains any paragraphs. If so (yes branch of step 416), layout extractor 204 may arrange the text based on the paragraph formatting in step 418. For example, text from the same paragraph may be grouped together.

Following step 418 or if the extracted text does not contain any paragraphs (no branch of step 416), layout extractor 204 may determine, in step 420, whether the extracted text contains any tables. If so (yes branch of step 420), layout extractor 204 may arrange the text based on the table formatting in step 422. For example, the table column header may be designated as a key and the entries under the table column header may be grouped together as possible values of the key.

Following step 422 or if the extracted text does not contain any tables (no branch of step 420), layout extractor 204 may determine, in step 424, whether the extracted text contains any grids (e.g., any layout in which regions of the layout are delimited by lines). If so (yes branch of step 424), layout extractor 204 may arrange the text based on the grid formatting in step 426. Using the grid of FIG. 9B as an example, the text within region 902a (Employee's social security number) may be grouped together, the text within region 904a (Employer identification number (EIN)) may be grouped together, and the text within region 906a (Employer's name, address and ZIP code)) may be grouped together.

Following step 426 or if the extracted text does not contain any grids (no branch of step 424), layout extractor 204 may determine, in step 428, whether any formatting in the datasource object was recognized. If no formatting was recognized (no branch of step 428), the layout extractor 204 may return the text that was received from the data extractor 202 without any further processing. Otherwise, if formatting was recognized (yes branch of step 428), the layout extractor 204 may return the arranged text in step 408 (e.g., arranged based on the font, paragraph, table and/or grid formatting). At step 410, layout extractor (e.g., with the assistance of PDFminer.six) may return location information that is associated with the text.

Figure 5:
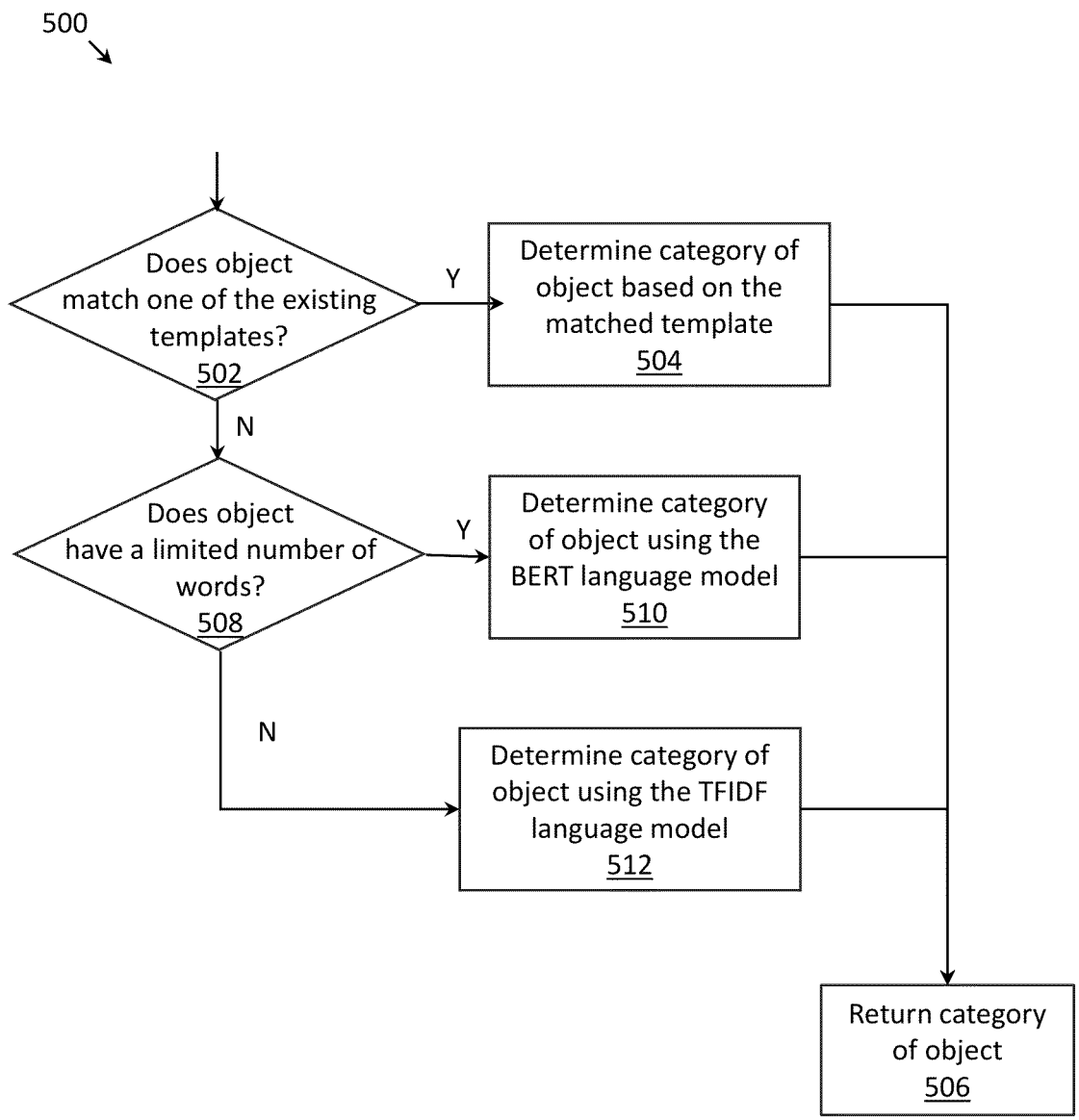
FIG. 5 depicts a flow diagram of a process performed by the object classifier, in accordance with one embodiment of the invention.
Figure 9B:
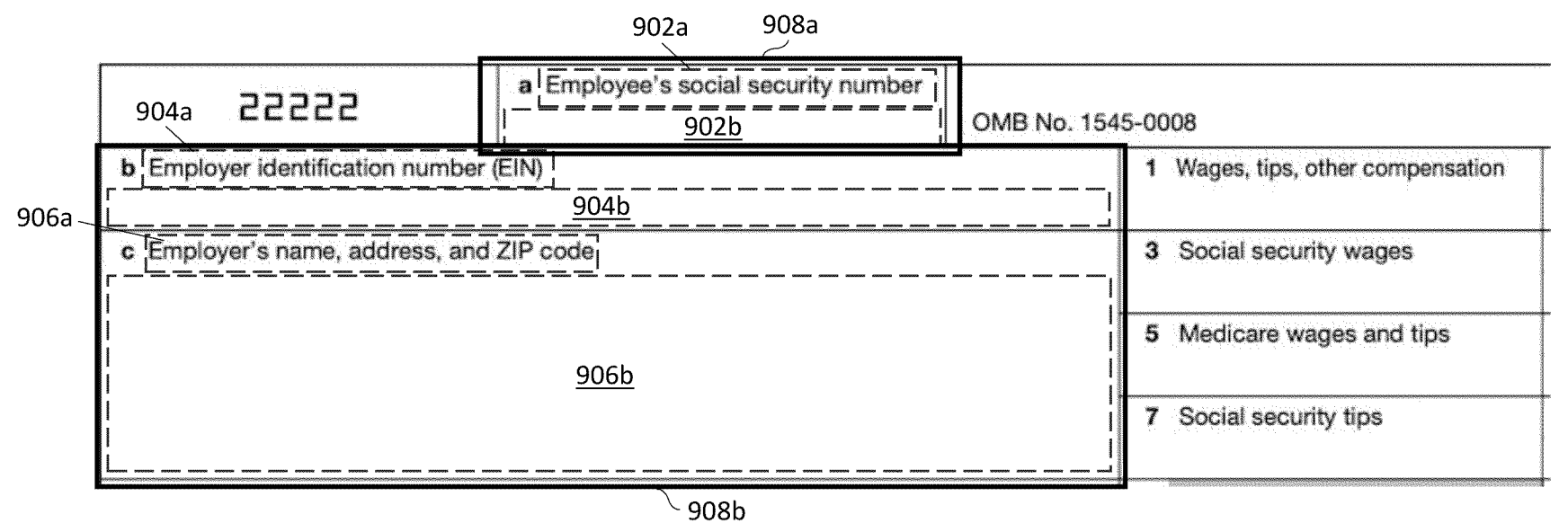

FIG. 5 depicts flow diagram 500 of a process that may be performed by the object classifier 206. At step 502, the object classifier 206 may determine whether the datasource object matches one of the templates stored in template datastore 212. One example template is depicted in FIG. 9B, in which certain regions of a form have been annotated (e.g., by a human user) to include keys and other regions of the form have been annotated (e.g., by a human user) to include empty spaces to be populated with the corresponding values. For example, region 902a has been annotated to contain the key "Employee's social security number" and region 902b has been annotated to contain (i.e., in a filled out version of the form) a value representing the employee's social security number. As another example, region 904a has been annotated to contain the key "Employer identification number (EIN)" and region 904b has been annotated to contain (i.e., in a filled out version of the form) a value representing the employer identification number. As another example, region 906a has been annotated to contain the key "Employer's name, address and ZIP code" and region 906b has been annotated to contain (i.e., in a filled out version of the form) a value representing the employer's name, address and ZIP code. Furthermore, the key-value pair contained within regions 902a and 902b may be annotated (e.g., using box 908a) to belong to the employee entity, and the key-value pairs contained within regions 904a, 904b, 906a, 906b may be annotated (e.g., using box 908b) to belong to the employer entity. Such annotation of templates by a human user may be regarded as training data for AI engine 102, as it provides examples of attribute extraction and local entity resolution to the AI engine 102. For increased clarity, an unannotated version of the form is depicted in FIG. 9A.

In the process of template matching, the datasource object may be compared with each of the templates in template datastore 212 until a matching template is found (or until no matching template is found). More specifically, the comparison may focus on the keys annotated in the templates and whether matching keys (in the corresponding regions) are present in the datasource object. If so, attribute extractor 208 may determine that the object matches one of the existing templates (yes branch of step 502). Otherwise, attribute extractor 208 may determine that the object does not match any of the existing templates (no branch of step 502).

In one embodiment, a vector database and a vector similarity search engine available from Qdrant (an open-source vector database and vector search engine written in Rust) may be used to perform template matching. Specifically, the formatted text of the datasource object may be provided to Qdrant and Qdrant will return the best matching template, or none if there is no such match.

If a matching template is found (yes branch of step 502), the object classifier 206 may determine, in step 504, the category of the datasource object based on the matched template 504. For instance if the matched template is a legal document, the datasource object may be categorized under legal.

Otherwise, if the datasource object does not match any of the templates in template datastore 212 (no branch of step 502), object classifier 206 may determine, in step 508, whether a number of words of the datasource object (or alternatively, a number of tokens, which may represent a small group of words) falls below a predetermined threshold. If so (yes branch of step 508), object classifier 206 may, in step 510, determine the category of the datasource object using the bidirectional encoder representations from transformers (BERT) language model, which was introduced in 2018 by researchers at Google, Inc.® of Mountain View, CA. Otherwise, if the number of words of the datasource object does not fall below the predetermined threshold (no branch of step 508), object classifier 206 may, in step 512, determine the category of the datasource object using the term frequency inverse document frequency (TFIDF) language model. In a TFIDF language model, a TFIDF value is computed for each unique word in a document, and conceptually reflects the importance of each word in that document relative to the words in a corpus of documents containing that document. The TFIDF value for a certain word increases with the number of times that word appears in the document and decreases with the number of times that word appears in the corpus of documents. Following any of steps 504, 510 or 512, the object classifier 206 may return, in step 506, the category of the datasource object determined in one of steps 504, 510 or 512.

Figure 6:
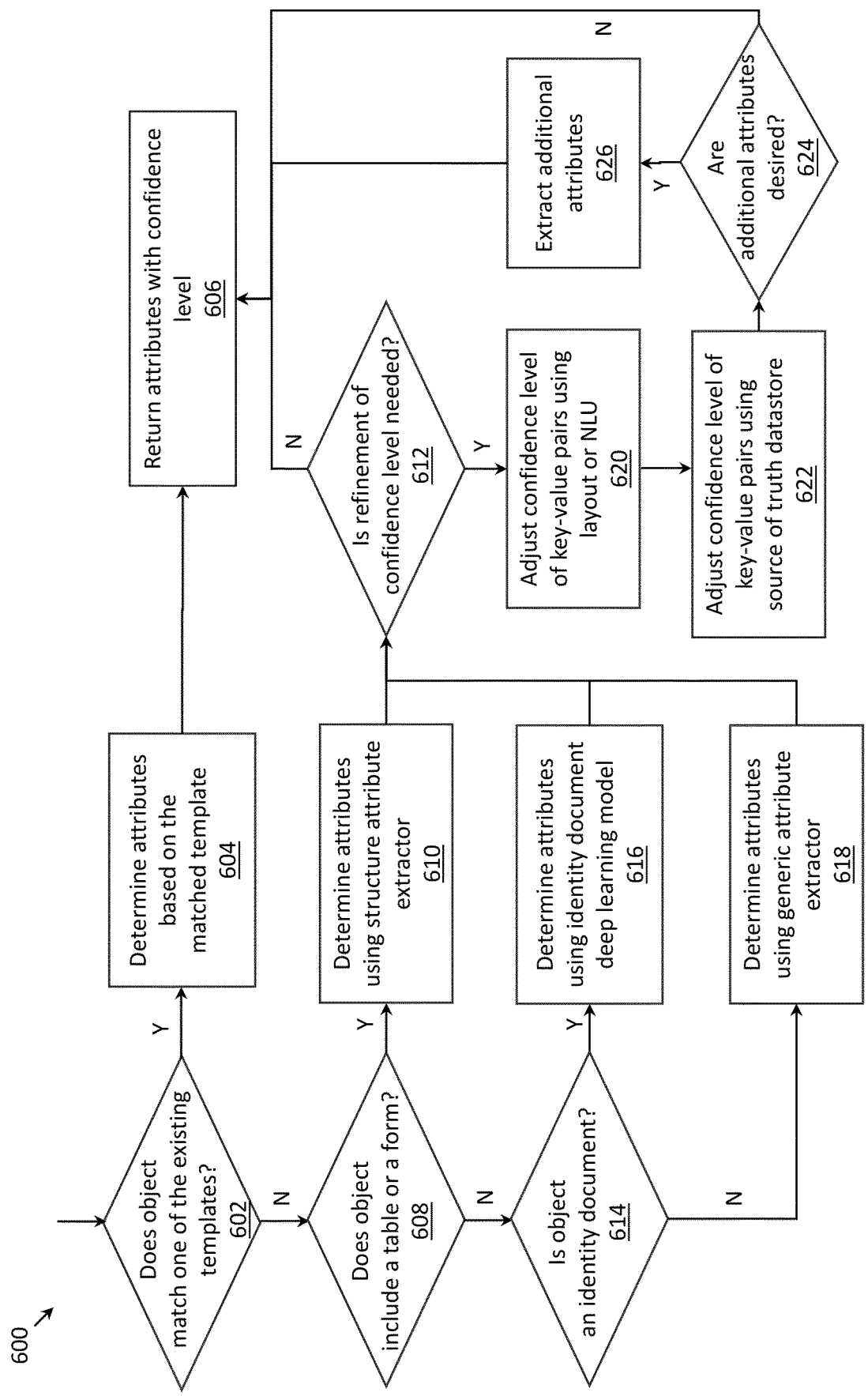
FIG. 6 depicts a flow diagram of a process performed by the attribute extractor, in accordance with one embodiment of the invention.

FIG. 6 depicts flow diagram 600 of a process that may be performed by attribute extractor 208. In step 602, attribute extractor 208 may determine whether the datasource object matches one of a plurality of templates. As the determination of step 602 was already carried out previously in step 502, the determination arrived upon in step 502 may be reused in step 602. If a matching template is found (yes branch of step 602), attribute extractor 208 may determine, in step 604, one or more attributes included in the datasource object based on the matched template. In many cases, attributes are expressed as key-value pairs. Assuming the template of FIG. 9B were determined to be a match to the datasource object, one attribute may be the key-value pair of (Employee's social security number, XXX-XX-XXXX), in which XXX-XX-XXXX represents a social security number extracted from the region in the datasource object corresponding to region 902b of the template depicted in FIG. 9B. Further, a confidence level may be associated with each extracted attribute. In the case of attributes determined using a matched template, the confidence level may be a higher value, as typically the attributes determined using a matched template are more accurate.

Otherwise, if the datasource object does not match any of the templates (no branch of step 602), attribute extractor 208 may determine, in step 608, whether the datasource object contains any tables or forms for which a template is not available. If so (yes branch of step 608), attribute extractor 208 may determine, in step 610, one or more attributes included in the datasource object using a structure attribute extractor. A structure attribute extractor differs from a conventional attribute extractor, such as Presidio® in that a structure attribute extractor is able to consider the structure more completely in a datasource object. For instance, based on a table layout, the structure attribute extractor may form key-value pairs in which the key is determined as the column header and the values are determined from the entries listed under the column header. As another example, based on a form layout, the structure attribute extractor may form key-value pairs in which the key is determined as a header within a respective boxed region in the form and the value is determined as text within the corresponding boxed region. Further, natural language understanding (NLU) may be used by the structure attribute extractor to form key-value pairs. For instance, the structure attribute extractor may identify the text "Name" as a key; however, it may not be clear whether the value associated with the key lies above, below, to the right, to the left, etc. of the key. If the text "John Smith" is extracted adjacent to the key "Name," NLU may be used to first understand the text "John Smith" as a name, and based on this understanding, structure attribute extractor may make the logical connection that "John Smith" should be designated as the value of the key "Name." Furthermore, based on the font information determined in step 414 by the layout extractor 204, the structure attribute extractor may form key-value pairs. For example, in the example below, bolded text may denote a key while non-bolded text may denote values:

| Name | John Doe |
|---|---|
| DOB | Jan. 1, 1980 |
| Phone Number | 650-111-1111 |

Alternatively, non-bolded text may denote a key while bolded text may denote values:

| Name | John Doe |
|---|---|
| DOB | Jan. 1, 1980 |
| Phone Number | 650-111-1111 |

As illustrated in the above example, the font information may play a critical role in identifying key-value pairs when the text is not organized within tables or grids.

Otherwise, if the datasource object does not contain any tables or forms (no branch of step 608), attribute extractor 208 may determine, in step 614, whether the datasource object is an identity document. If so (yes branch of step 614), attribute extractor 208 may determine, in step 616, one or more attributes included in the datasource object using a deep learning model configured to determine attributes from identity documents. Otherwise, if the datasource object is not an identity document (no branch of step 614), attribute extractor 208 may determine, in step 618, one or more attributes included in the datasource object using a conventional attribute extractor, such as Presidio®.

Following any of steps 610, 616 or 618, attribute extractor 208 may determine whether refinement of the confidence level is needed. For example, any attribute with a confidence level below a threshold could be flagged as needing further refinement. If refinement of the confidence levels is needed (yes branch of step 612), the respective confidence levels of the key-value pairs may be adjusted, in step 620, using the extracted layout information or NLU. For instance, if the key and value of an extracted key-value pair are located in close proximity to one another in the datasource object, the confidence level of the key-value pair may be increased to a higher value. At step 622, attribute extractor 208 may additionally adjust the respective confidence levels of the key-value pairs using a source of truth stored in datastore 214. For instance, if an extracted key-value pair matches a key-value pair stored in source of truth datastore 214, the confidence level of the key-value pair may be increased to a higher value.

At step 624, a user may be queried as to whether additional attributes are desired (i.e., additional to those already extracted), and if so (yes branch of step 624), additional attributes may be extracted in step 626. For instance, an identity document may have the attribute of "eye color" that was not recognized by the conventional attribute extractor, and in this case, the user may instruct the attribute extractor 208 to extract the attribute of "eye color." Finally, following step 604, the no branch of step 612, the no branch of step 624, or step 626, attribute extractor 208 may return the extracted attributes optionally with associated confidence levels.

Figure 7:
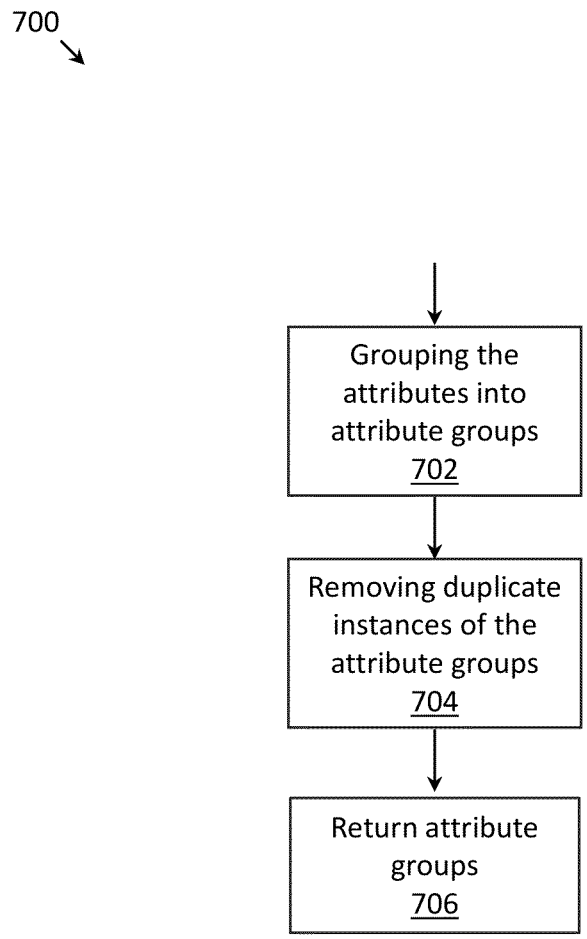
FIG. 7 depicts a flow diagram of a process performed by the local entity resolver, in accordance with one embodiment of the invention.

FIG. 7 depicts flow diagram 700 of a process that may be performed by the local entity resolver 210. At step 702, local entity resolver 210 may group the attributes into one or more attribute groups. For instance, if the extracted text reads "John's birthday is Jan. 1, 1980 and his phone number is 650-111-1111," it may be inferred through natural language processing (NLP) that the attributes of (DOB: Jan. 1, 1980) and (Phone Number: 650-111-1111) belong to John. As such, these attributes may be grouped together, and further may be associated with the entity of John. As another example, if a form contains the key-value pairs of Name=John Doe, SSN=123-45-6789, spouse's name=Jane Doe and spouse's SSN=111-11-1111, the local entity resolver 210 may group together the name=John Doe and SSN=123-45-6789 for one entity and the spouse's name=Jane Doe and spouse's SSN=111-11-1111 for another entity.

At step 704, local entity resolver 210 may remove duplicate instances of the attribute groups from a single datasource object, in a process known as de-duplication. In some instances, the instances may be identical in the information content but not in how the information is formatted. In such instances, these instances may still be regarded as duplicates and de-duplication may be applied. For instance, if one attribute group were (DOB: Jan. 1, 1980, 650-111-1111) and another attribute group were (Date of Birth: 1 Jan. 1980, 1-650-111-1111), one of these attribute groups may be removed.

In some instance, the instances may be substantially similar but not identical. In such instances, these instances may still be regarded as duplicates and de-duplication may be applied. For instance, if one attribute group were (Name: John, DOB: Jan. 1, 1980, 650-111-1111) and another attribute group were (Name: John Doe, DOB: Jan. 1, 1980, 1-650-111-1111), one of these attribute groups may be removed. In a preferred embodiment, the attribute group that include the most information content may be preserved.

Thus in the above example, the attribute group (Name: John Doe, DOB: Jan. 1, 1980, 1-650-111-1111) would be preserved as it additionally contains the last name "Doe."

Finally, at step 706, local entity resolver 210 may return the determined attribute groups. To clarify, local entity resolver 210 is agnostic to whether other datasource objects include the same local entity (entities). Thus, the entity corresponding to John Doe may be assigned one local entity identifier (e.g., local entity ID: 1) for one datasource object, while the same entity corresponding to John Doe will be assigned to another local entity identifier (e.g., local entity ID: 2) for another datasource object. It is then the role of the global entity resolver 108 to map (or resolve) these different local entity identifiers to a common global entity identifier. It is further noted for clarity, that the local entity identifiers are unique across the privacy and security system 100. As such, each time a local entity identifier is created, care must be taken that the same local entity identifier is not currently in use.

Figure 8:
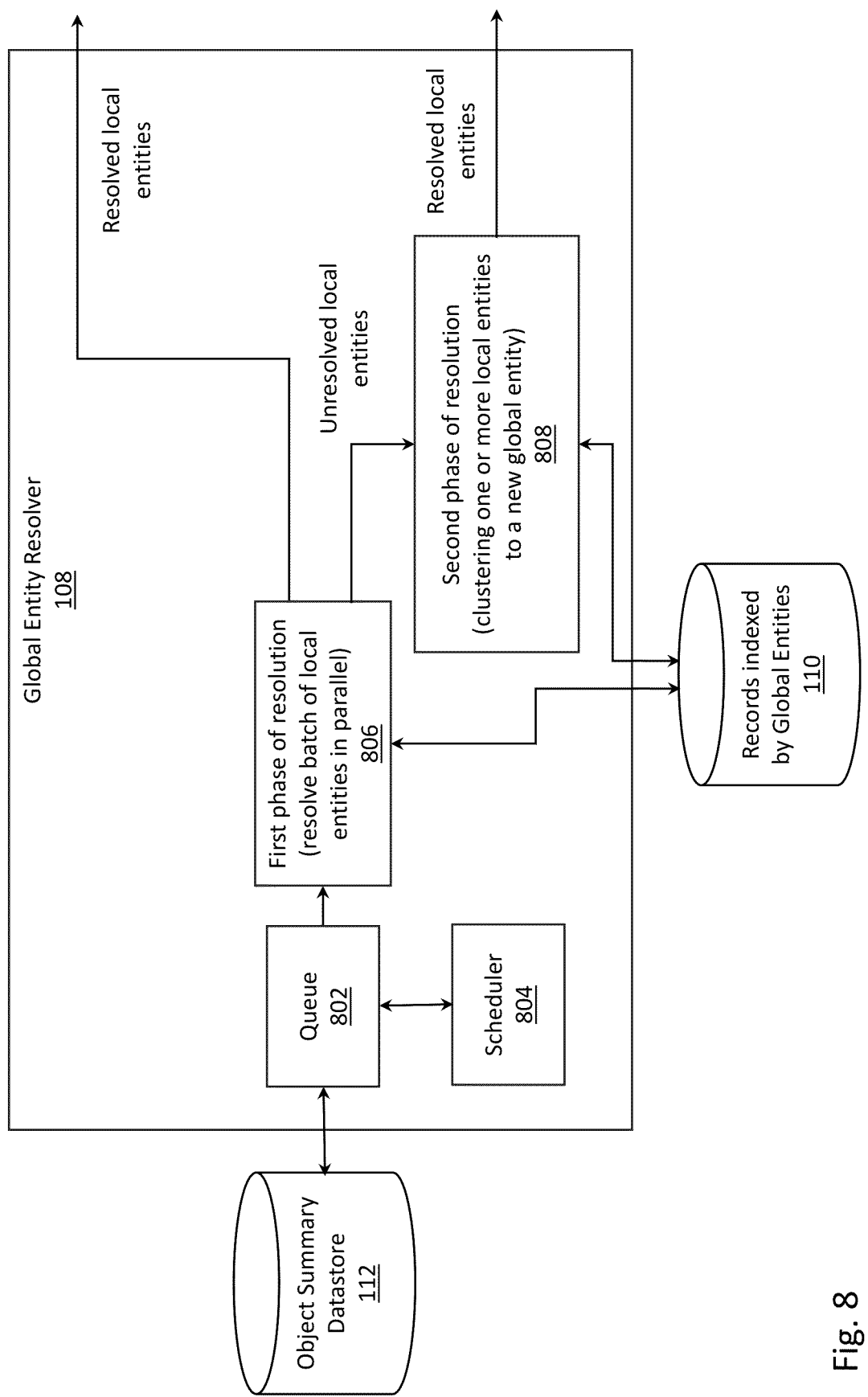
FIG. 8 depicts additional details regarding the global entity resolver, in accordance with one embodiment of the invention.

FIG. 8 depicts additional details regarding the global entity resolver 108. As previously described, global entity resolver 108 may augment the object summaries stored in datastore 112 to include information regarding global entities. More specifically, global entity resolver of 108 may map each of the local entities to a global entity. As the global resolution of local entities occurs in batches over time, some of the local entities in object summary datastore 112 may already be mapped through previous mapping operations. Hence, scheduler 804 is first tasked with finding the unmapped local entities (more specifically, the local entity identifiers of unmapped local entities) and placing those local entity identifiers into queue 802. These local entity identifiers may be aggregated in batches at queue 802 of the global entity resolver 108 over a time period (e.g., 1 minute, 1 hour, 1 day, 1 week, etc.) that is managed by scheduler 804.

In a first phase of resolution (performed by subroutine 806), the global entity resolver 108 may attempt to map each local entity identifier to a global entity identifier by querying datastore 110. Such processing of local entity identifiers in the first phase may be performed in parallel by multiple threads of subroutine 806 for increased throughput of processing. Specifically, for each local entity identifier from the queue 802, subroutine 806 may search datastore 110 for a global entity identifier having a list of attributes which substantially matches the attributes of the local entity identifier. If a match can be found, the local entity identifier is assigned to the global entity identifier having the list of attributes which substantially matches the attributes associated with the local entity identifier. Further, if a match is found, subroutine 806 may determine whether a union operation needs to be performed on the list of attributes. That is, if the list of attributes associated with the local entity identifier has information regarding the entity that has not yet been recorded in the list of attributes associated with the global entity identifier, that additional information may be added to the list of attributes associated with the global entity identifier.

However, if no match is found, the processing may proceed to a second phase of resolution (performed by subroutine 808), during which the local entities with substantially similar attributes may be clustered together. For instance local entities having more than 50%, 60%, 70%, 80%, 90% of the attributes in common or having all attributes in common may be considered to have substantially similar attributes. A new global entity identifier may be assigned to each cluster, and a union of the attributes within each cluster may be performed for those clusters that include two or more local entity identifiers. For each cluster, the new global entity identifier, the local entities within the cluster, and the attributes associated with that cluster (which may be attributes arrived upon through the union operation) may be stored in datastore 110. As should be understood, each local entity identifier within a cluster may be mapped (i.e., resolved) to the new global entity identifier assigned to that cluster.

In contrast to the first phase of resolution, the second phase of resolution may be performed by a single thread of subroutine 808 so that that thread is the only thread performing the clustering operation. Further, during the first or second phase of resolution, global entity resolver 108 may correct any errors that are be identified in the attributes. For instance, if John's DOB is listed as Jan. 1, 1980 in datastore 110, but an object summary contains the attribute (Name: John, DOB 1/1/0980), global entity resolver 108 may infer that an error exists in the attribute of the object summary (e.g., since the year of birth 0980 is an invalid year for people alive today), and proactively correct the error to match the information stored in datastore 110.

Figure 10A:
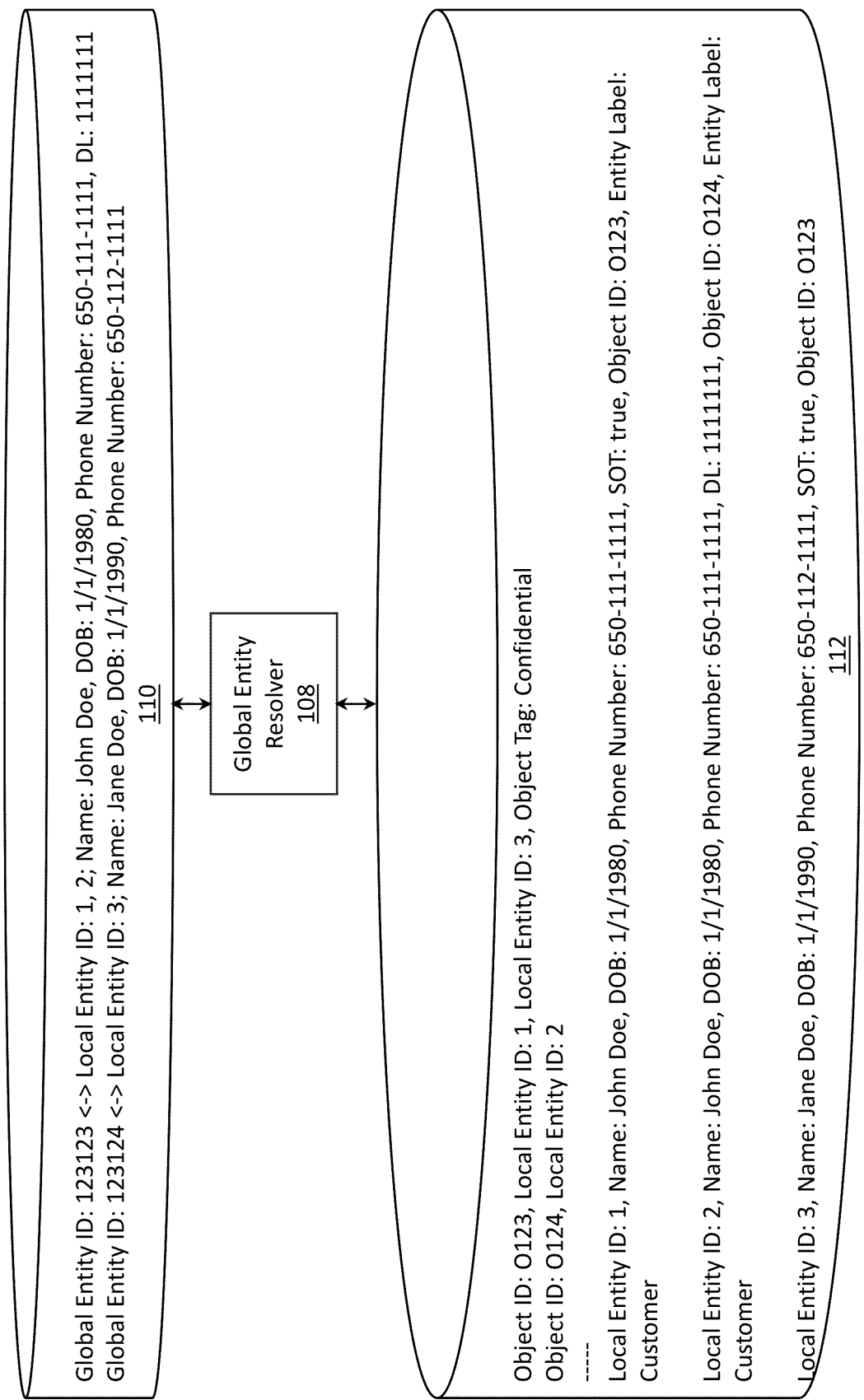
FIGS. 10A-10B depict an example of global entity resolution, in accordance with one embodiment of the invention.
Figure 10B:
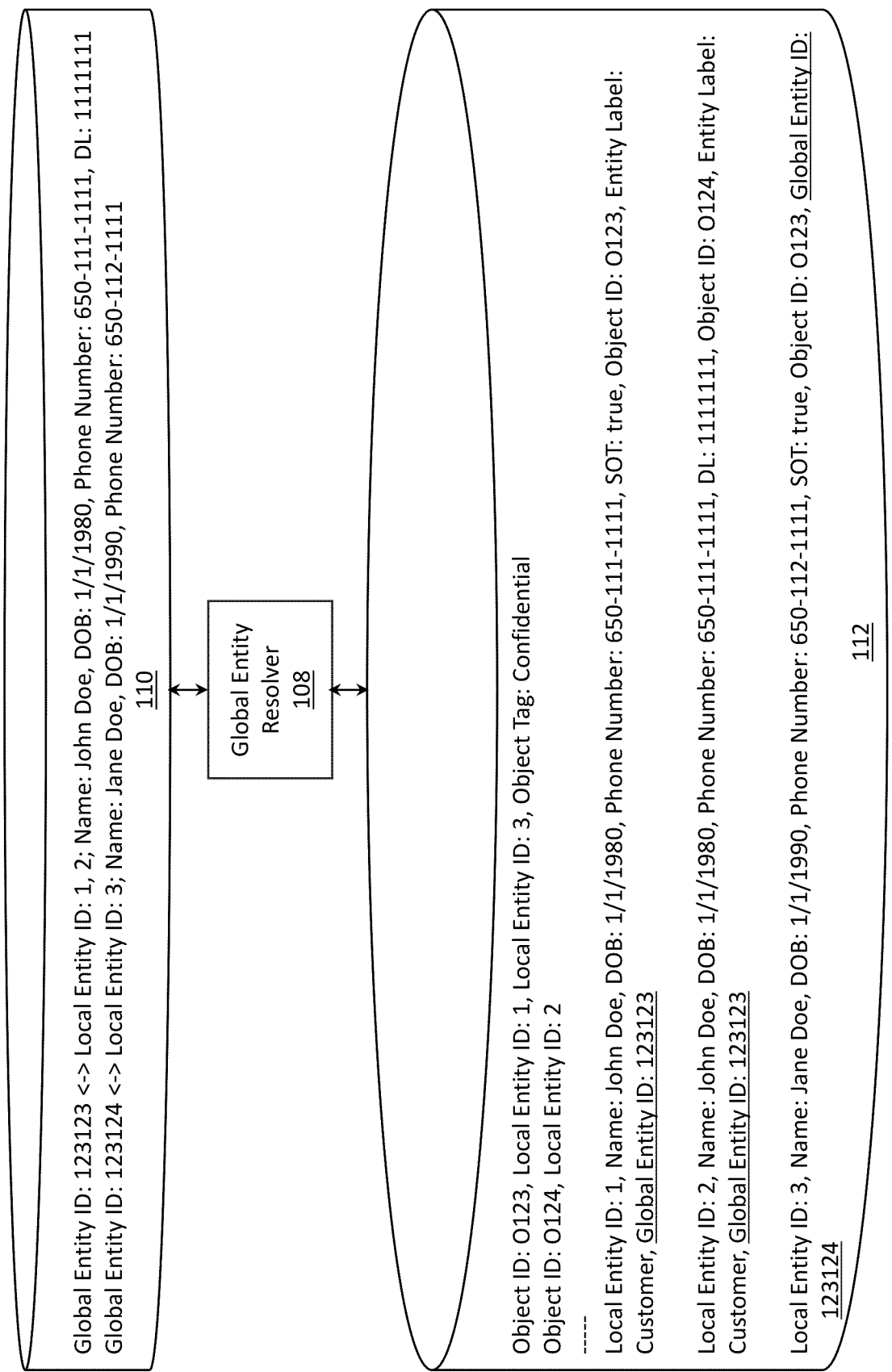

FIGS. 10A and 10B depict an example of global entity resolution. FIG. 10A depicts two object summaries stored at object summary datastore 112 prior to the step of global entity resolution, and FIG. 10B depicts the object summaries after the step of global entity resolution. The first object summary includes the object identifier O123, local entity identifier 1, local entity identifier 3, and object tag: confidential (e.g., generated by object tag generator 216). The second object summary includes the object identifier O124, and local entity identifier 2. In the example representation of object summaries depicted in FIGS. 10A-10B, the mapping from local entities to attributes is listed separately from the mapping from objects to local entities.

Local entity identifier 1 is mapped to the attributes of:

Name: John Doe
DOB: Jan. 1, 1980
Phone Number: 650-111-1111
SOT: true
Object ID: O123
Entity Label: Customer Local entity identifier 2 is mapped to the attributes of Name: John Doe
DOB: Jan. 1, 1980
Phone Number: 650-111-1111
DL: 1111111
Object ID: O124
Entity Label: Customer Local entity identifier 3 is mapped to the attributes of:

Name: Jane Doe
DOB: Jan. 1, 1990
Phone Number: 650-112-1111
SOT: true
Object ID:O123

In these examples, the tag "SOT: true" indicates that the set of attributes matches a set of attributes present in source of truth datastore 214, and indicates a higher degree of confidence is associated with that set of attributes.

As a concrete example, the first object summary may summarize a PDF document containing the joint stock market accounts of John Doe and Jane Doe and the second object summary may summarize an email written by Jane Doe to John Doe. For instance, the salutation "Hi John!" in the email may result in the creation of the attribute "Local Entity ID: 2" for the second object summary.

As explained above, during global entity resolution, global entity resolver 108 attempts to map each of the local entity identifiers to a global entity identifier. In the present example, the attributes associated with the local entity ID 1 substantially matches the attributes associated with the global entity ID 123123, so the local entity ID 1 is mapped (by subroutine 806) to the global entity ID 123123, as shown in FIG. 10B Likewise, the attributes associated with the local entity ID 2 substantially matches the attributes associated with the global entity ID 123123, so the local entity ID 2 is mapped (by subroutine 806) to the global entity ID 123123, as shown in FIG. 10B. Lastly, the attributes associated with the local entity ID 3 substantially matches the attributes associated with the global entity ID 123124, so the local entity ID 3 is mapped (by subroutine 806) to the global entity ID 123124, as shown in FIG. 10B. Since all the local entities have been mapped (by subroutine 806) to global entities in the present example of FIGS. 10A-10B in the first phase of resolution, the second phase of resolution is not needed. For ease of understanding, the differences between FIGS. 10A and 10B have been underlined.

Figure 10C:
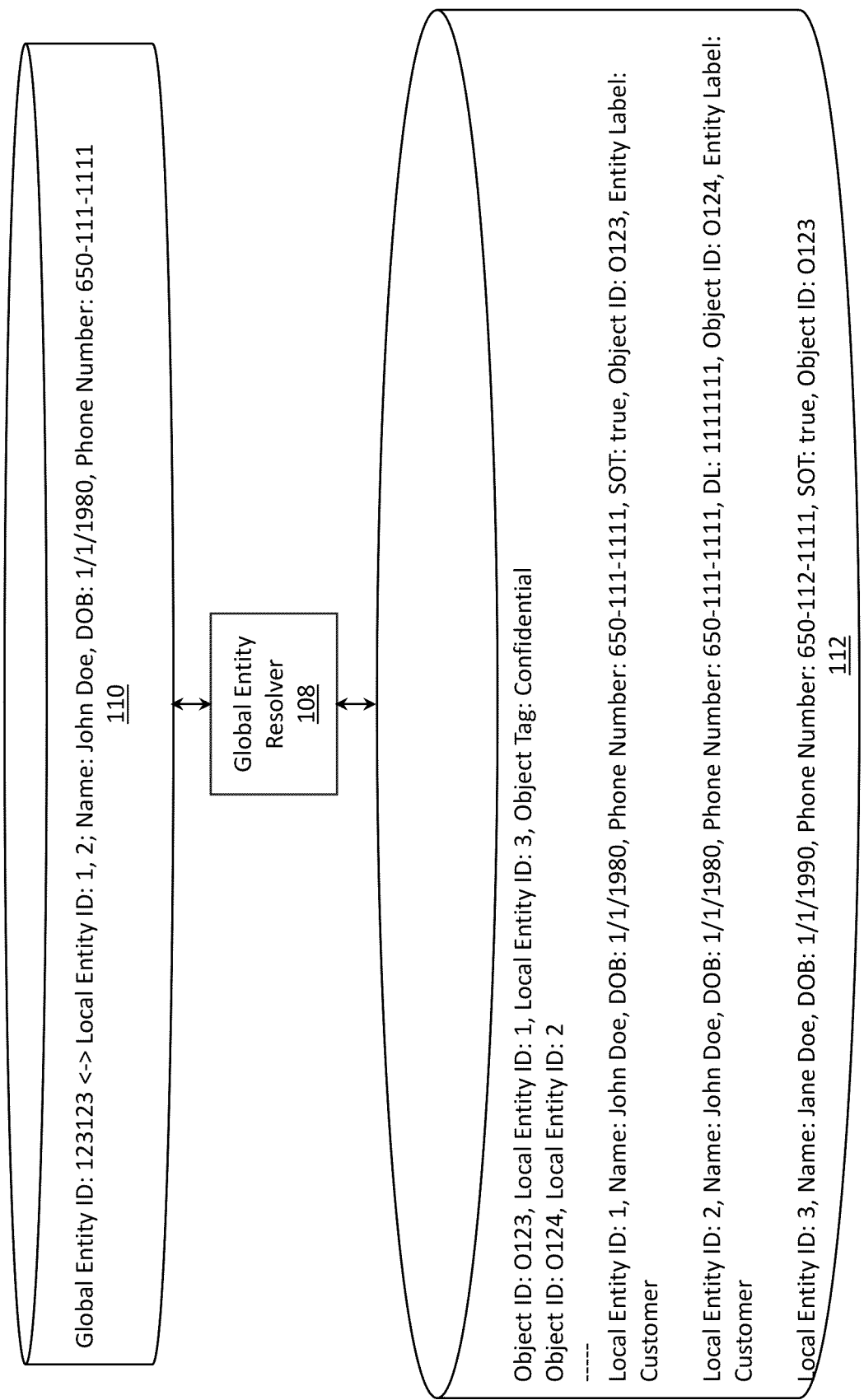
FIGS. 10C-10D depict another example of global entity resolution, in accordance with one embodiment of the invention.
Figure 10D:
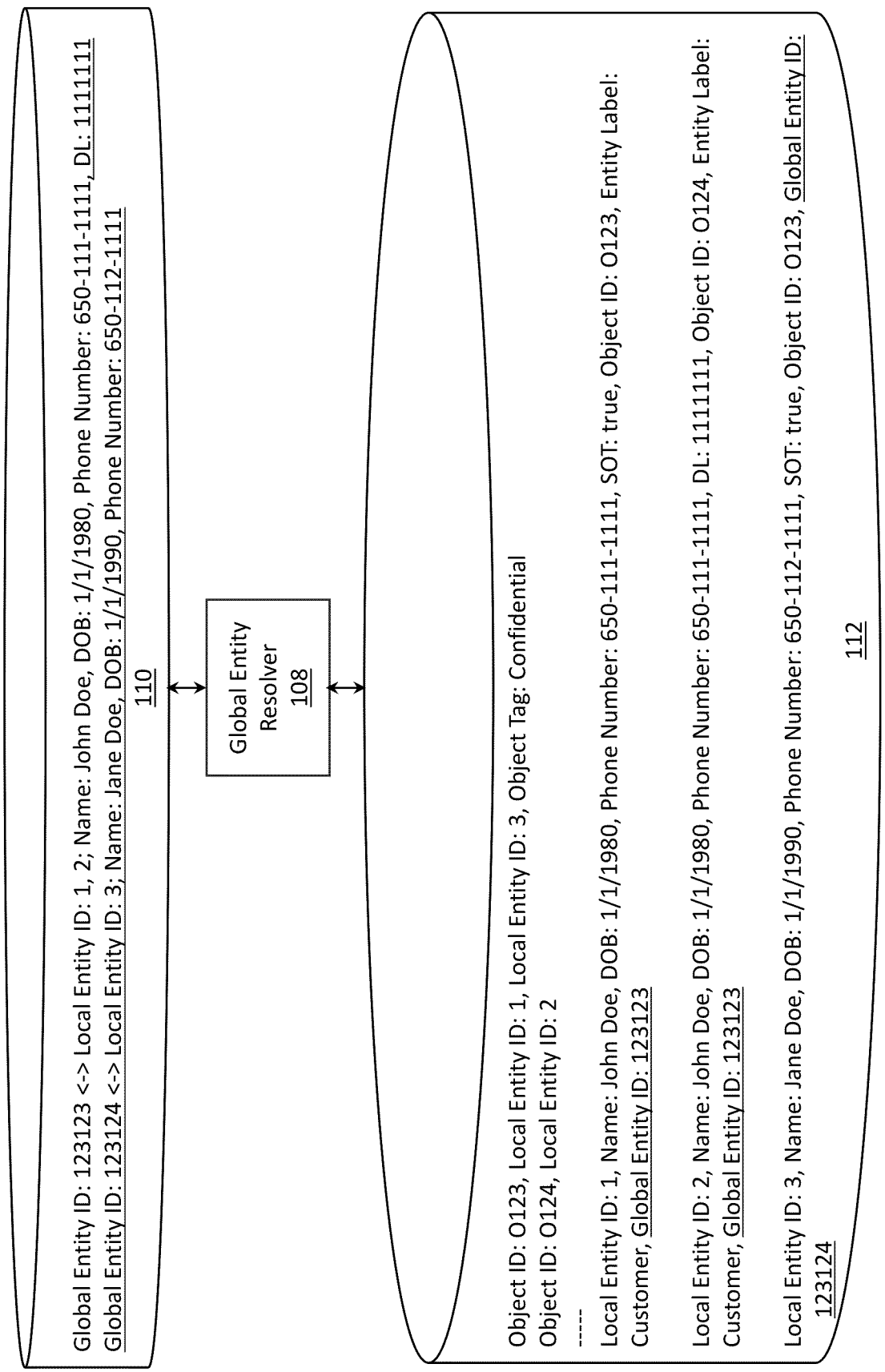

FIGS. 10C and 10D depict a further example of global entity resolution. FIG. 10C depicts two object summaries stored at object summary datastore 112 prior to the step of global entity resolution, and FIG. 10D depicts the object summaries after the step of global entity resolution. In the present example, the attributes associated with the local entity ID 1 substantially matches the attributes associated with the global entity ID 123123, so the local entity ID 1 is mapped (by subroutine 806) to the global entity ID 123123, as shown in FIG. 10D Likewise, the attributes associated with the local entity ID 2 substantially matches the attributes associated with the global entity ID 123123, so the local entity ID 2 is mapped (by subroutine 806) to the global entity ID 123123, as shown in FIG. 10D. Here, since the attribute DL: 1111111 from the local entity ID 2 is not present in the attributes of global entity ID: 123123, such attribute may be added to global entity ID: 123123, as shown in FIG. 10D. Lastly, the attributes associated with the local entity ID 3 do not substantially match any of the attributes in datastore 110, so local entity ID 3 is left unmapped by subroutine 806. The present example illustrates the second phase of resolution in which subroutine 808 clusters local entity ID 3 into a new cluster (e.g., in the present example, the cluster only has a single local entity), and assigns the new global entity ID: 123124 to the local entity ID 3. Subroutine 808 stores the new global entity ID: 123124, the local entity ID 3 and the attributes "Name: Jane Doe, DOB: 1/1/1990, Phone Number: 650-112-1111" in datastore 110, and further maps the local entity ID 3 to the new global entity ID: 123124 in datastore 112, as shown in FIG. 10D.

Figure 10E:
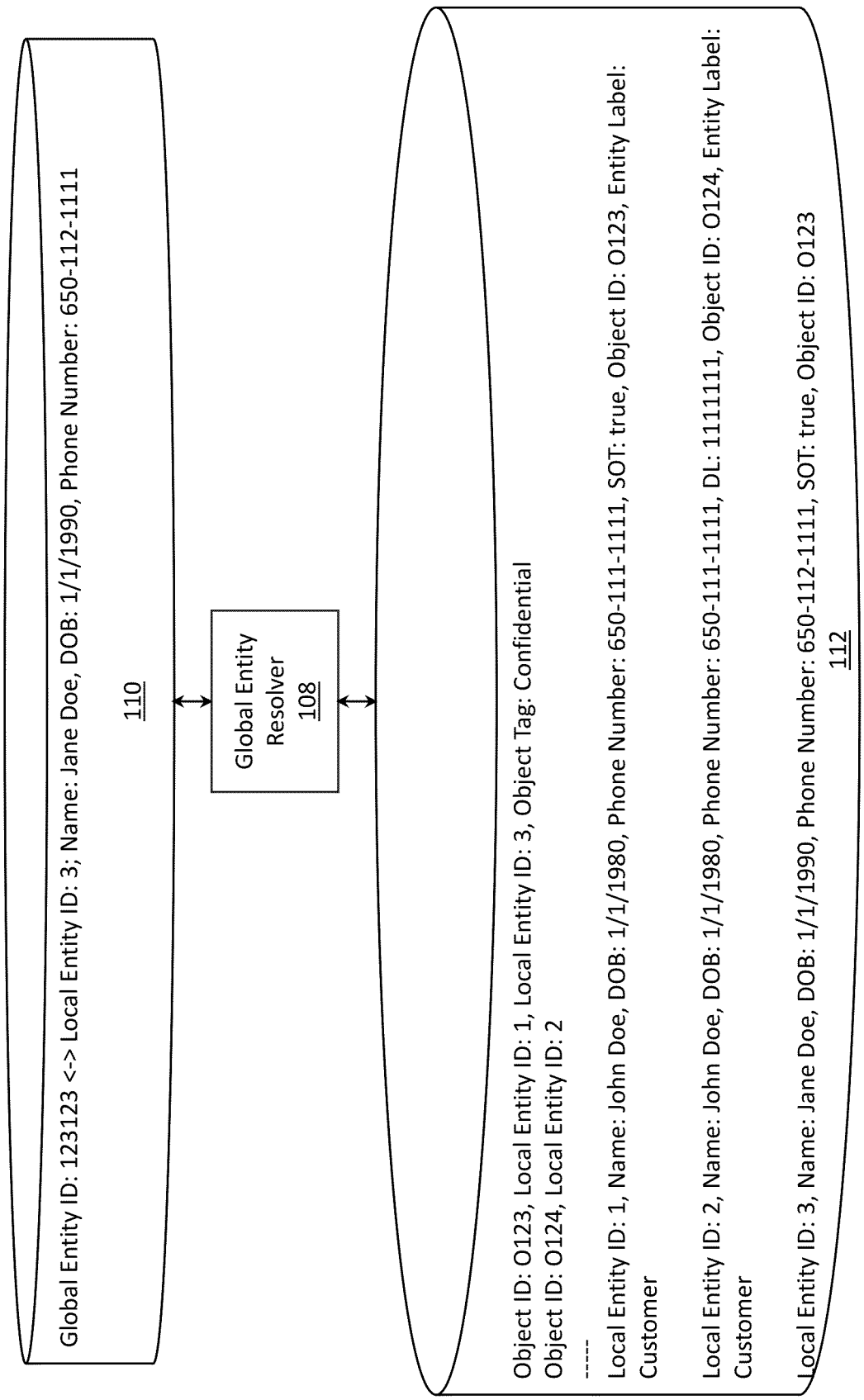
FIGS. 10E-10F depict another example of global entity resolution, in accordance with one embodiment of the invention.
Figure 10F:
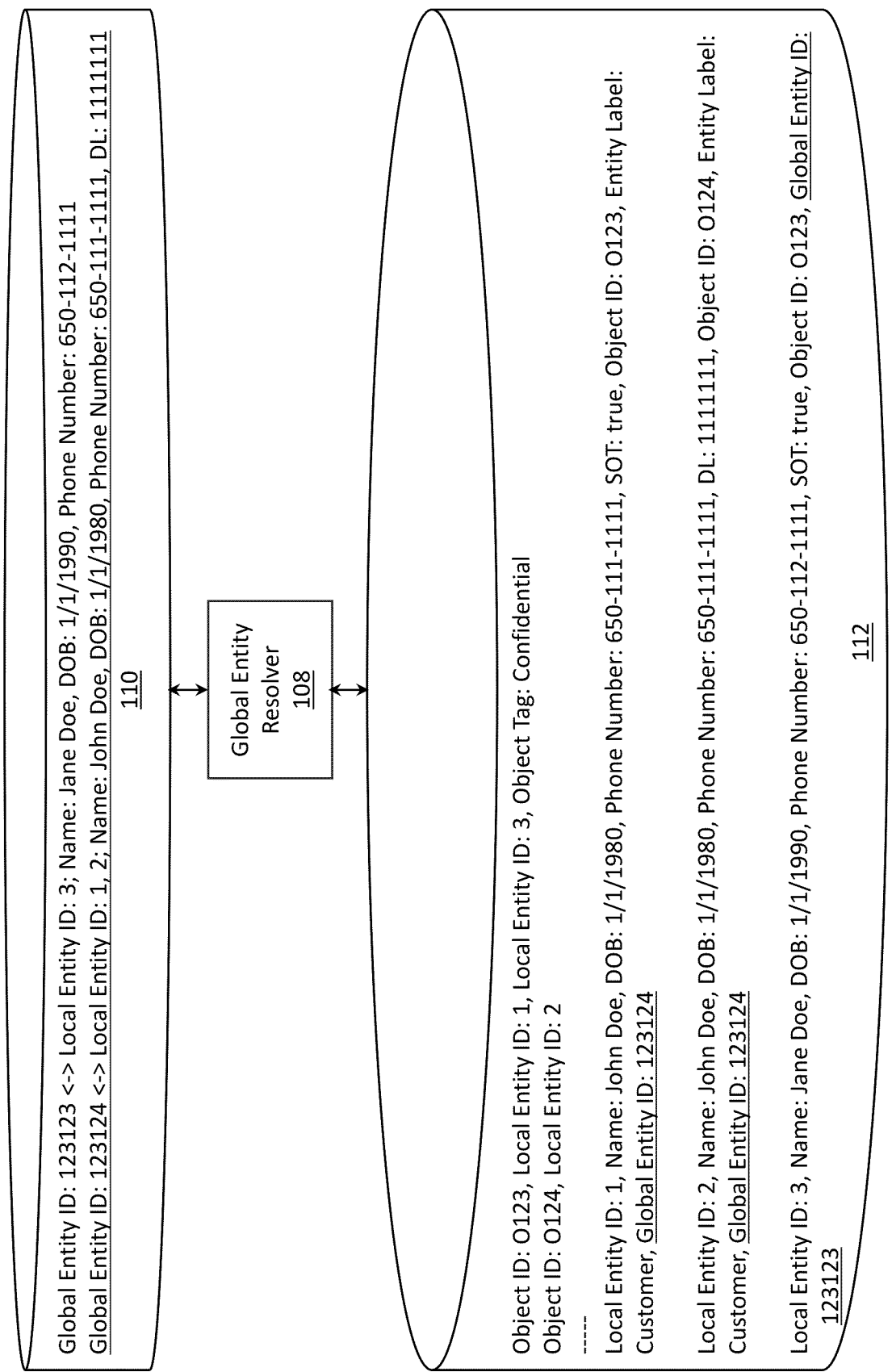

FIGS. 10E and 10F depict a further example of global entity resolution. FIG. 10E depicts two object summaries stored at object summary datastore 112 prior to the step of global entity resolution, and FIG. 10F depicts the object summaries after the step of global entity resolution. In the present example, the attributes associated with the local entity IDs 1 and 2 do not substantially match any of the attributes in datastore 110, so local entity IDs 1 and 2 are left unmapped by subroutine 806. The attributes associated with the local entity ID 3 substantially match the attributes associated with the global entity ID 123123, so the local entity ID 3 is mapped (by subroutine 806) to the global entity ID 123123, as shown in FIG. 10F.

The present example illustrates the second phase of resolution in which subroutine 808 clusters local entity IDs 1 and 2 into a new cluster (since their attributes are substantially similar to one another), and assigns the new global entity ID: 123124 to the cluster. Subroutine 808 stores the new global entity ID: 123124, the local entity IDs 1 and 2 and the attributes "Name: John Doe, DOB: Jan. 1, 1980, Phone Number: 650-111-1111, DL: 1111111" in datastore 110, as shown in FIG. 10F. If not already apparent "Name: John Doe, DOB: Jan. 1, 1980, Phone Number: 650-111-1111, DL: 1111111" was formed by taking the union of the attributes of local entity IDs 1 and 2. Subroutine 808 further maps the local entity IDs 1 and 2 to the new global entity ID: 123124 in datastore 112, as shown in FIG. 10F.

The present way in which the records have been organized provides an advantage on how datasource objects can be efficiently located and then retrieved and/or modified. For instance, returning to the example object summary in FIG. 10B, suppose the privacy and security system 100 receives a request to delete all of the objects associated with John Doe. Upon determining that John Doe is associated with the global entity identifier 123123, system 100 may determine that John Doe is associated with the local entities 1 and 2 from datastore 110. Then, upon querying the object summary datastore 112, system 100 may determine that local entity 1 is associated with object O123, and local entity 2 is associated with object O124. Accordingly, the remediation action taken by remediation module 122 could be to delete objects O123 and O124 in response to the request to delete all of the objects associated with John Doe.

Figure 11:
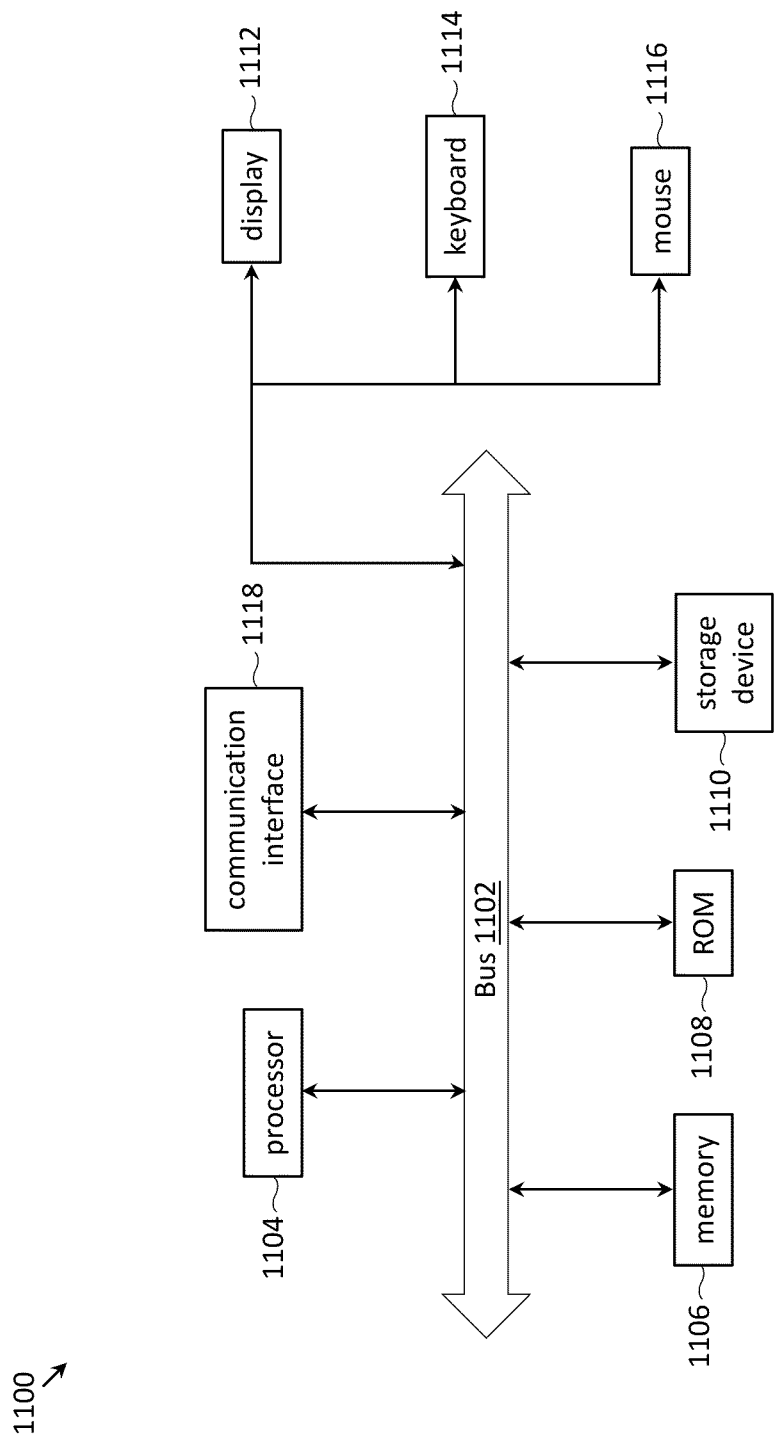
FIG. 11 depicts components of a computer system in which computer readable instructions instantiating the methods of the present invention may be stored and executed.

FIG. 11 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 11 provides an example of a system 1100 that may be representative of any of the computing systems (e.g., privacy & security system 100, etc.) discussed herein. Examples of system 1100 may include a smartphone, a desktop, a laptop, a mainframe computer, an embedded system, etc. Note, not all of the various computer systems have all of the features of system 1100. For example, certain ones of the computer systems discussed above may not include a display inasmuch as the display function may be provided by a client computer communicatively coupled to the computer system or a display function may be unnecessary. Such details are not critical to the present invention.

System 1100 includes a bus 1102 or other communication mechanism for communicating information, and a processor 1104 coupled with the bus 1102 for processing information. Computer system 1100 also includes a main memory 1106, such as a random access memory (RAM) or other dynamic storage device, coupled to the bus 1102 for storing information and instructions to be executed by processor 1104. Main memory 1106 also may be used for storing temporary variables or other intermediate information during execution of instructions to be executed by processor 204. Computer system 1100 further includes a read only memory (ROM) 1108 or other static storage device coupled to the bus 1102 for storing static information and instructions for processor 1104. A storage device 1110, for example a hard disk, flash memory-based storage medium, or other storage medium from which processor 1104 can read, is provided and coupled to bus 1102 for storing information and instructions (e.g., operating systems, applications programs and the like).

Computer system 1100 may be coupled via bus 1102 to display 1112, such as a flat panel display, for displaying information to a computer user. An input device 1114, such as a keyboard including alphanumeric and other keys, may be coupled to bus 1102 for communicating information and command selections to processor 1104. Another type of user input device is cursor control device 1116, such as a mouse, a trackpad, or similar input device for communicating direction information and command selections to processor 1104 and for controlling cursor movement on display 1112. Other user interface devices, such as microphones, speakers, etc. are not shown in detail but may be involved with the receipt of user input and/or presentation of output.

The processes referred to herein may be implemented by processor 1104 executing appropriate sequences of computer-readable instructions contained in main memory 1106. Such instructions may be read into main memory 1106 from another computer-readable medium, such as storage device 1110, and execution of the sequences of instructions contained in main memory 1106 causes processor 1104 to perform the associated actions. In alternative embodiments, hard-wired circuitry or firmware-controlled processing units may be used in place of or in combination with processor 1104 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Computer system 1100 also includes communication interface 1118 coupled to bus 1102. Communication interface 1118 may provide a two-way data communication channel with a computer network, which provides connectivity to and among the various computer systems discussed above. For example, communication interface 1118 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1100 can send and receive messages and data through the communication interface 1118 and in that way communicate with hosts accessible via the Internet. It is noted that the components of system 1100 may be located in a single device or located in a plurality of physically and/or geographically distributed devices.

Thus, a system and method for maintaining the privacy and security of data has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   receiving, in parallel by each of a plurality of datasource processors, datasource objects from respective ones of a plurality of datasources, each datasource processor being communicatively coupled to one or more of the plurality of datasources;
   communicating, by the plurality of datasource processors, with an artificial intelligence (AI) engine to generate an object summary for each of the datasource objects, wherein each respective object summary includes an object identifier, one or more local entities derived from the respective datasource object, and a mapping from each of the one or more local entities to one or more attributes derived from the respective datasource object;
   generating the object summary for each of the datasource objects, wherein generating the object summary for each datasource object comprises:
      determining, by a text extractor of the AI engine, text included in the datasource object;
      determining, by a layout extractor of the AI engine, a layout of the text;
      arranging, by the layout extractor of the AI engine, the text based on the layout of the text;
      determining, by an object classifier of the AI engine, a category of the datasource object based on the text and layout of the text;
      determining, by an attribute extractor of the AI engine, attributes included in the datasource object; and
      grouping, by a local entity resolver of the AI engine, the attributes into one or more attribute groups;
   augmenting each of the object summaries to include information regarding global entities by (i) aggregating the local entities in batches at a queue of a global entity resolver, and (ii) for each of the local entities aggregated at the queue, mapping by the global entity resolver the local entity to one of the global entities;
   evaluating, by each of a plurality of policy engines, a subset of the object summaries with respect to a security and/or privacy policy, wherein the evaluation includes determining, for each object summary, whether a security and/or privacy violation exists with respect to the respective datasource object with which the object summary is associated, wherein the policy engines perform the evaluation step in parallel with one another, and wherein the security and/or privacy violation is recognized when an operation concerning the datasource object associated with the object summary violates the security and/or privacy policy; and
   when the security and/or privacy violation is recognized, applying a remediation measure in connection with the datasource object for which the security and/or privacy violation exists.

2. The method of claim 1, wherein the text extractor determines text included in the datasource object by:
   performing optical character recognition (OCR) on the datasource object to produce OCR output;
   determining whether a quality of the OCR output is acceptable; and when the quality of the OCR output is determined to be acceptable, returning the text present in the OCR output.

3. The method of claim 1, wherein the text extractor determines text included in the datasource object by:
   determining whether the datasource object contains personal identifiable information (PII); and
   converting the datasource object from a non-portable document format to a portable document format (PDF) only when the datasource object contains PII.

4. The method of claim 1, wherein the object classifier determines the category of the datasource object by:
   determining whether the datasource object matches one of a plurality of templates;
   when the datasource object matches one of the templates, determining the category of the datasource object based on the matched template;
   otherwise, when the datasource object does not match any of the templates, determining whether a number of words of the datasource object is below a predetermined threshold;
   when the number of words of the datasource object is below the predetermined threshold, determining the category of datasource object based on a bidirectional encoder representations from transformers (BERT) language model; and
   otherwise, when the number of words of the datasource object is not below the predetermined threshold, determining the category of datasource object based on a term frequency inverse document frequency (TFIDF) language model.

5. The method of claim 1, wherein the attribute extractor determines attributes included in the datasource object by:
   determining whether the datasource object matches one of a plurality of templates;
   when the datasource object matches one of the templates, determining the attributes based on the matched template;
   otherwise, when the datasource object does not match any of the templates, determining whether the datasource object contains any tables or forms;
   when the datasource object contains any tables or forms, determining the attributes included in the datasource object using a structure attribute extractor that is configured to extract attributes from tables and forms;
   otherwise, when the datasource object does not contain any tables or forms, determining whether the datasource object is an identity document;
   when the datasource object is an identity document, determining the attributes included in the datasource object using a deep learning model configured to determine attributes from identity documents; and
   otherwise, when the datasource object is not an identity document, determining the attributes included in the datasource object using a generic attribute extractor that is configured to determine attributes from unformatted text.

6. The method of claim 5, wherein each of the attributes comprises a key, a value and a confidence level indicating a confidence associated with the key being paired with the value, wherein for each of the attributes that are not determined based on the matched template, determining whether refinement of the confidence level is needed, and when refinement of the confidence level is needed, adjusting the confidence level based on one or more of the layout of the text or a source of truth datastore.

7. The method of claim 1, wherein generating the object summary for each datasource object comprises further comprises removing, by the local entity resolver, duplicate instances of the one or more attribute groups.

8. The method of claim 1, wherein mapping each of the local entities to one of the global entities comprises:
   in a first phase of resolution, determining whether the local entity is associated with any existing global entities, and when the local entity is associated with one of the existing global entities, mapping the local entity to the associated existing global entity, otherwise, leaving the local entity unmapped; and
   in a second phase of resolution following the first phase, for the local entities that are unmapped, clustering one or more of the local entities having substantially similar attributes into clusters and assigning a new global entity to each of the clusters.

9. The method of claim 1, further comprising:
   in response to receiving an update to the security and/or privacy policy, updating the security and/or privacy policy;
   selecting only ones of the object summaries that are impacted by the update to the security and/or privacy policy; and
   evaluating the selected object summaries based on the updated security and/or privacy policy.

10. A non-transitory computer-readable storage medium comprising instructions that, when executed by a processor, cause the processor to:
   receive, in parallel by each of a plurality of datasource processors, datasource objects from respective ones of a plurality of datasources, each datasource processor being communicatively coupled to one or more of the plurality of datasources;
   communicate, by the plurality of datasource processors, with an artificial intelligence (AI) engine to generate an object summary for each of the datasource objects, wherein each respective object summary includes an object identifier, one or more local entities derived from the respective datasource object, and a mapping from each of the one or more local entities to one or more attributes derived from the respective datasource object;
   generate the object summary for each of the datasource objects, wherein generating the object summary for each datasource object comprises:
      determining, by a text extractor of the AI engine, text included in the datasource object;
      determining, by a layout extractor of the AI engine, a layout of the text;
      arranging, by the layout extractor of the AI engine, the text based on the layout of the text;
      determining, by an object classifier of the AI engine, a category of the datasource object based on the text and layout of the text;
      determining, by an attribute extractor of the AI engine, attributes included in the datasource object; and
      grouping, by a local entity resolver of the AI engine, the attributes into one or more attribute groups;
   augment each of the object summaries to include information regarding global entities by (i) aggregating the local entities in batches at a queue of a global entity resolver, and (ii) for each of the local entities aggregated at the queue, mapping by the global entity resolver the local entity to one of the global entities;
   evaluate, by each of a plurality of policy engines, a subset of the object summaries with respect to a security and/or privacy policy, wherein the evaluation includes determining, for each object summary, whether a security and/or privacy violation exists with respect to the respective datasource object with which the object summary is associated, wherein the policy engines perform the evaluation step in parallel with one another, and wherein the security and/or privacy violation is recognized when an operation concerning the datasource object associated with the object summary violates the security and/or privacy policy; and when the security and/or privacy violation is recognized, apply a remediation measure in connection with the datasource object for which the security and/or privacy violation exists.

11. The non-transitory computer-readable storage medium of claim 10, wherein the text extractor determines text included in the datasource object by:
performing optical character recognition (OCR) on the datasource object to produce OCR output;
determining whether a quality of the OCR output is acceptable; and
when the quality of the OCR output is determined to be acceptable, storing the text present in the OCR output.

12. The non-transitory computer-readable storage medium of claim 10, wherein the text extractor determines text included in the datasource object by:
determining whether the datasource object contains personal identifiable information (PII); and
converting the datasource object from a non-portable document format to a portable document format (PDF) only when the datasource object contains PII.

13. The non-transitory computer-readable storage medium of claim 10, wherein the object classifier determines the category of the datasource object by:
determining whether the datasource object matches one of a plurality of templates;
when the datasource object matches one of the templates, determining the category of the datasource object based on the matched template;
otherwise, when the datasource object does not match any of the templates, determining whether a number of words of the datasource object is below a predetermined threshold;
when the number of words of the datasource object is below the predetermined threshold, determining the category of datasource object based on a bidirectional encoder representations from transformers (BERT) language model; and
otherwise, when the number of words of the datasource object is not below the predetermined threshold, determining the category of datasource object based on a term frequency inverse document frequency (TFIDF) language model.

14. The non-transitory computer-readable storage medium of claim 10, wherein the attribute extractor determines attributes included in the datasource object by:
determining whether the datasource object matches one of a plurality of templates;
when the datasource object matches one of the templates, determining the attributes based on the matched template;
otherwise, when the datasource object does not match any of the templates, determining whether the datasource object contains any tables or forms;
when the datasource object contains any tables or forms, determining the attributes included in the datasource object using a structure attribute extractor that is configured to extract attributes from tables or forms;
otherwise, when the datasource object does not contain any tables or forms, determining whether the datasource object is an identity document;
when the datasource object is an identity document, determining the attributes included in the datasource object using a deep learning model configured to determine attributes from identity documents; and
otherwise, when the datasource object is not an identity document, determining the attributes included in the datasource object using a generic attribute extractor that is configured to determine attributes from unformatted text.

15. The non-transitory computer-readable storage medium of claim 14, wherein each of the attributes comprises a key, a value and a confidence level indicating a confidence associated with the key being paired with the value, wherein for each of the attributes that are not determined based on the matched template, determining whether refinement of the confidence level is needed, and when refinement of the confidence level is needed, adjusting the confidence level based on one or more of the layout of the text or a source of truth datastore.

16. The non-transitory computer-readable storage medium of claim 10, wherein generating the object summary for each datasource object comprises further comprises removing, by the local entity resolver, duplicate instances of the one or more attribute groups.

17. The non-transitory computer-readable storage medium of claim 10, wherein mapping each of the local entities to one of the global entities comprises:
in a first phase of resolution, determining whether the local entity is associated with any existing global entities, and when the local entity is associated with one of the existing global entities, mapping the local entity to the associated existing global entity, otherwise, leaving the local entity unmapped; and
in a second phase of resolution following the first phase, for the local entities that are unmapped, clustering one or more of the local entities having substantially similar attributes into clusters and assigning a new global entity to each of the clusters.

18. The non-transitory computer-readable storage medium of claim 10, further comprising instructions that cause the processor to:
in response to receiving an update to the security and/or privacy policy, update the security and/or privacy policy;
select only ones of the object summaries that are impacted by the update to the security and/or privacy policy; and
evaluate the selected object summaries based on the updated security and/or privacy policy.

\* \* \* \* \*